US011987063B2

(12) United States Patent
Nakai et al.

(10) Patent No.: US 11,987,063 B2
(45) Date of Patent: May 21, 2024

(54) HANDHELD PRINTING APPARATUS

(71) Applicant: CANON KABUSHIKI KAISHA, Tokyo (JP)

(72) Inventors: Hiroshi Nakai, Kanagawa (JP); Tetsuyo Ohashi, Kanagawa (JP); Akira Kida, Kanagawa (JP); Sho Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 17/815,513

(22) Filed: Jul. 27, 2022

(65) Prior Publication Data

US 2023/0035842 A1 Feb. 2, 2023

(30) Foreign Application Priority Data

Jul. 30, 2021 (JP) ................................ 2021-125312

(51) Int. Cl.

| | |
|---|---|
| ***B41J 3/36*** | (2006.01) |
| ***B41J 3/46*** | (2006.01) |
| ***B41J 29/13*** | (2006.01) |
| ***B41J 29/393*** | (2006.01) |

(52) U.S. Cl.

CPC ................ *B41J 3/36* (2013.01); *B41J 29/13* (2013.01); *B41J 29/393* (2013.01); *B41J 3/46* (2013.01)

(58) Field of Classification Search

CPC ... B41J 3/36; B41J 29/13; B41J 29/393; B41J 3/46; B41J 2/17553; B41J 2/17513

See application file for complete search history.

(56) References Cited

U.S. PATENT DOCUMENTS

2021/0187966 A1* 6/2021 Reiss .................... B41J 25/304

FOREIGN PATENT DOCUMENTS

JP 2019001055 A 1/2019

* cited by examiner

*Primary Examiner* — Bradley W Thies

(74) *Attorney, Agent, or Firm* — Canon U.S.A., Inc. IP Division

(57) ABSTRACT

A printing apparatus includes: an apparatus body held by a user and provided with a printing unit configured to perform printing in a case of being moved in a first direction; a first guide unit configured to guide the movement in the first direction; a second guide unit rotatably held with respect to a structure fixed to the apparatus body and configured to guide movement in a second direction intersecting with the first direction; and a drive unit configured to be connected with the second guide unit and to rotate the second guide unit so that the structure moves to the second direction relative to the second guide unit by driving of the drive unit.

26 Claims, 21 Drawing Sheets

HANDHELD PRINTING APPARATUS

BACKGROUND

Field of the Disclosure

The present disclosure relates to a handheld printing apparatus.

Description of the Related Art

There has been known a manually scanned handheld printing apparatus for performing printing by having an operator manually scan its body in a printing direction on a printing surface of a print medium and by using a printing unit so as to be synchronized with the printing scan.

In a case of performing printing for the second line after performing a printing scan of the first line in a general handheld printing apparatus, an operator needs to perform a line break operation to move the apparatus body to a printing start position for the next line in a direction perpendicular to a printing direction. In this line break operation, misalignment in a printing scan direction may occur, or a moving amount in a line break direction may differ from a target moving amount. This may result in gaps between lines or overlap with a previous line.

Japanese Patent Laid-Open No. 2019-001055 (hereinafter referred to as "Patent Document 1") discloses a handheld printer including, on its body, a guide member that guides a line break operation to move the apparatus body in a line break direction orthogonal to a printing direction, and a moving amount change unit that changes a moving amount of the guide member. In Patent Document 1, the guide member is located at a position away from the object to be conveyed during printing. In a line break operation, an operator moves the apparatus body in the line break direction with a lower end of the guide member in contact with an object to be conveyed, and the guide member comes into contact with the moving amount change unit, thereby moving the apparatus body by a predetermined amount.

However, in the printer described in Patent Document 1, in order to obtain an accurate line break moving amount, the operator needs to move the printer body until the guide member surely abuts on the moving amount change member. That is, a line break amount may change due to the abutting operation by the operator.

SUMMARY

A printing apparatus according to one aspect of the present disclosure is a printing apparatus including: an apparatus body held by a user and provided with a printing unit configured to perform printing in a case of being moved in a first direction; a first guide unit configured to guide the movement in the first direction; a second guide unit rotatably held with respect to a structure fixed to the apparatus body and configured to guide movement in a second direction intersecting with the first direction; and a drive unit configured to be connected with the second guide unit and to rotate the second guide unit so that the structure moves to the second direction relative to the second guide unit by driving of the drive unit.

Further features of the present disclosure will become apparent from the following description of exemplary embodiments with reference to the attached drawings.

DESCRIPTION OF THE EMBODIMENTS

Figure 1:
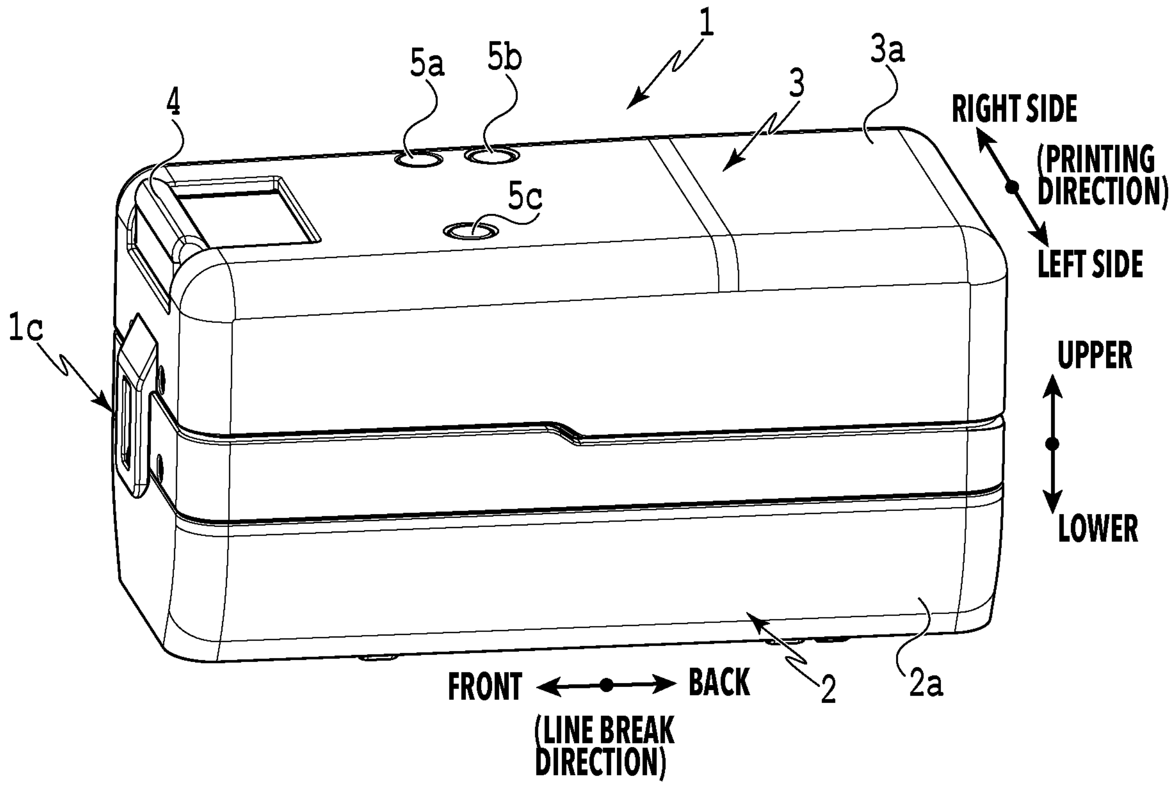
FIG. 1 is a perspective view illustrating the top side of the entire printer, according to one more embodiment of the subject innovation.

Embodiments of the present disclosure will be described below with reference to drawings. Note that the following embodiments do not limit the present disclosure, and not all combinations of features described in the present embodiments are essential. The same configuration will be described with the same reference numerals.

Note that the term "print" herein is not limited to formation of information with a meaning such as characters or a figure, and includes formation of information with a meaning and also information without a meaning. Moreover, the term is not limited by whether what is to be "printed" is elicited so as to be visually perceptible to humans, and represents a wide range of meanings such as formation of an image, a design, a pattern, or the like on a print medium and processing a print medium.

Also, the term "ink" (also referred to as "liquid") is to be widely interpreted as with the definitions of "print" mentioned above. Thus, the term represents a liquid to be used to form an image, a design, a pattern, or the like or process a print medium by being applied to a print medium, or to process an ink (e.g., solidification or insolubilization of a colorant in an ink to be applied to a print medium).

First Embodiment

<Schematic Configuration of Handheld Printing Apparatus>

Figure 2:
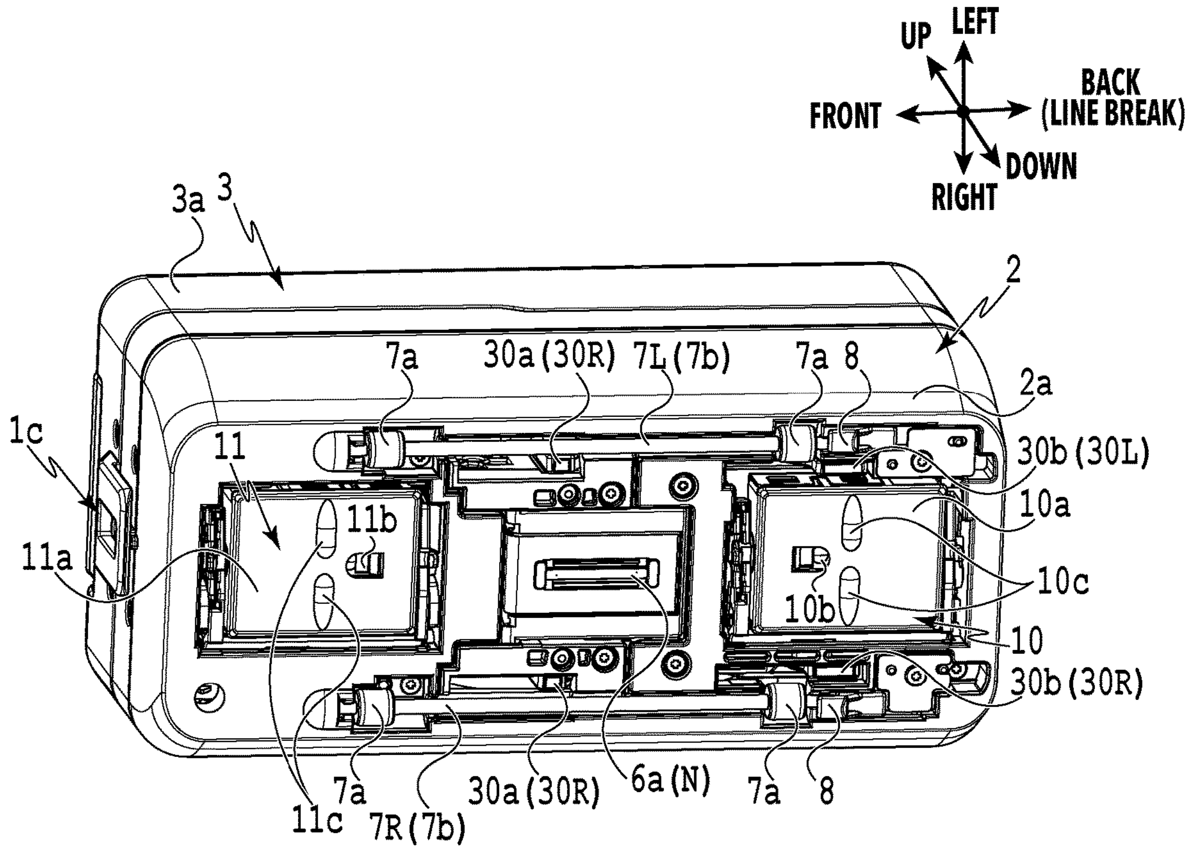
FIG. 2 is a perspective view illustrating the bottom side of the entire printer, according to one more embodiment of the subject innovation.
Figure 3:
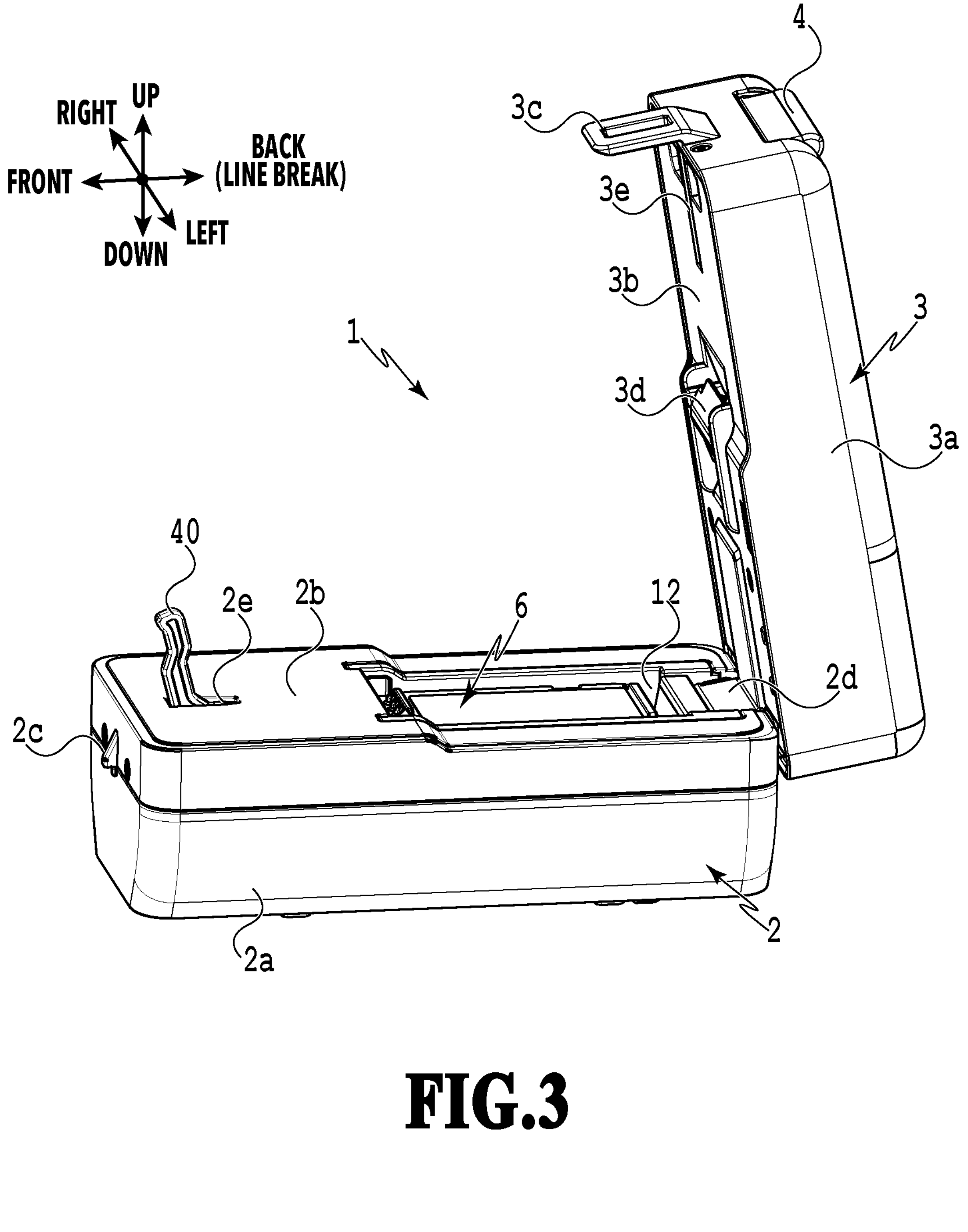
FIG. 3 is a perspective view illustrating a state where a lower housing portion and an upper housing portion are open, according to one more embodiment of the subject innovation.
Figure 4:
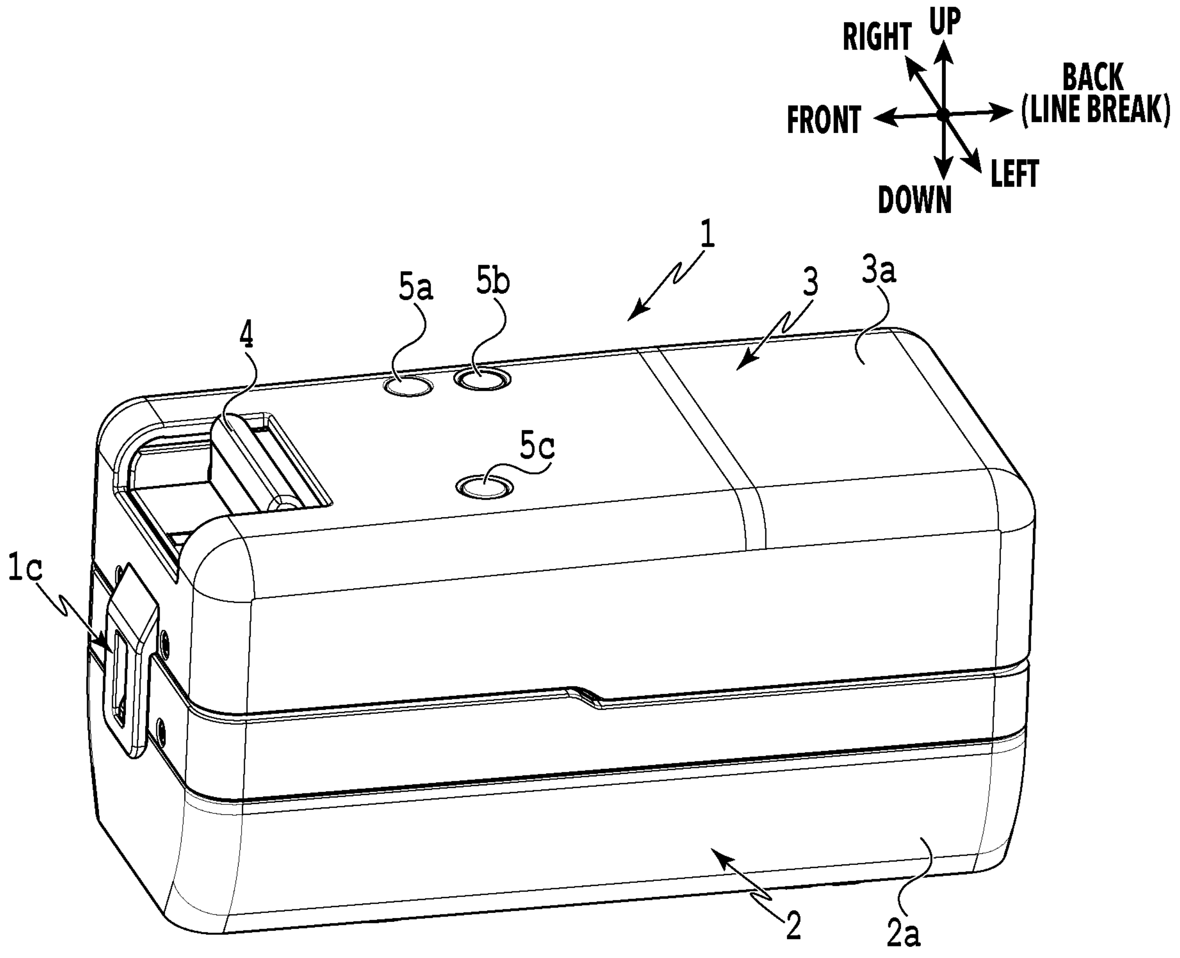
FIG. 4 is a perspective view illustrating the top side of the entire printer, according to one more embodiment of the subject innovation.

With reference to FIGS. 1 to 12 as appropriate, a handheld printing apparatus of the present embodiment will be described below. Note that the handheld printing apparatus will be hereinafter referred to simply as "printer" or "apparatus". First, a schematic configuration of the printer will be described with reference to FIGS. 1 to 4. FIG. 1 is a perspective view illustrating the top side of the entire printer 1. FIG. 2 is a perspective view illustrating the bottom side of the entire printer 1. FIG. 3 is a perspective view illustrating a state where a lower housing portion 2 and an upper housing portion 3 are open. FIG. 4 is a perspective view illustrating the top side of the entire printer 1.

As illustrated in FIGS. 1 to 3, the printer 1 includes the lower housing portion 2 and the upper housing portion 3 as a housing. The upper housing portion 3 is rotatably coupled to the lower housing portion 2 at a hinge portion 2*d* (FIG. 3) within a predetermined angle.

FIG. 1 illustrates a state where the lower housing portion 2 and the upper housing portion 3 are closed and the printer 1 is in use. FIG. 3 illustrates a state where the lower housing portion 2 and the upper housing portion 3 are open. The state of FIG. 3 is mainly for attaching/detaching (replacing) a print head 6 which is a printing unit. In the usage state illustrated in FIG. 1, a lock mechanism 1*c* is provided, in which a hook portion 3*c* (FIG. 3) provided on an upper cover 3*a* of the upper housing portion 3 is hooked on a convex shape 2*c* (FIG. 3) provided on an upper case 2*b* (FIG. 3) of the lower housing portion 2. This prevents the lower housing portion 2 and the upper housing portion 3 from being unnecessarily opened.

A print head holding portion 12 (FIG. 3) for detachably holding the print head 6 is disposed in the lower housing portion 2. Also, guide rollers 7L and 7R are rotatably fixed to the lower housing portion 2, which are a first guide unit for guiding the printer 1 to move linearly in a printing direction that is a first direction. Further, the lower housing portion 2 holds a line break mechanism 20 (see FIG. 8 to be described later) having guide plates (30L and 30R) which are a second guide unit for guiding the movement of the printer 1 in a line break direction that is a second direction intersecting with (substantially orthogonal to) the printing direction. The lower housing portion 2 also holds tracking sensors 10 and 11 (position detection sensors) and the like that detect a moving amount of the printer 1 in a case of moving on a printing surface of a print medium P.

A line break lever 4 operated by an operator during a line break operation is held in the upper housing portion 3 so as to be slidable back and forth. The upper housing portion 3 also holds a control board (not illustrated) for performing printing control and the like of the printer 1 and electrical components (not illustrated) such as a battery. Further, the upper housing portion 3 holds input buttons such as a power button 5*a*, a wireless connection button 5*b*, and a printing start button 5*c*. The lower housing portion 2 and the upper housing portion 3 are connected by a wire component such as a flexible cable not illustrated via the hinge portion 2*d*, and the wire component makes it possible to transmit and receive a drive signal and a sensor signal to and from the print head 6.

As illustrated in FIG. 3, a drive lever 40 connected to the line break mechanism 20 to be described later protrudes from a slit portion 2*e* of the upper case 2*b* of the lower housing portion 2. In a case of shifting to the state where the lower housing portion 2 and the upper housing portion 3 illustrated in FIG. 1 are closed, the drive lever 40 is configured to enter the upper housing portion 3 through a slit portion 3*e* provided in a lower case 3*b* of the upper housing portion 3 and to engage with the line break lever 4. As illustrated in FIG. 4, the drive lever 40 is operated by the operator pulling the line break lever 4, and the line break mechanism 20 to be described later is driven. The direction in which the operator operates the line break lever 4 is the line break direction for moving the printer 1 in the line break direction (backward) as illustrated in FIG. 4.

<Outline of Printing Operation>

FIGS. 5A to 5D are views illustrating an outline of a printing operation using the printer 1. In the present embodiment, the print head 6 is an inkjet print head. On a nozzle surface 6*a* (FIG. 2) of the print head 6, a nozzle array including a plurality of nozzles for ejecting an ink is formed in a direction (front-back direction) substantially orthogonal to the printing direction (left-right direction). Printing is performed using the area of a width N of the nozzle array in the front-back direction.

Figure 5A:
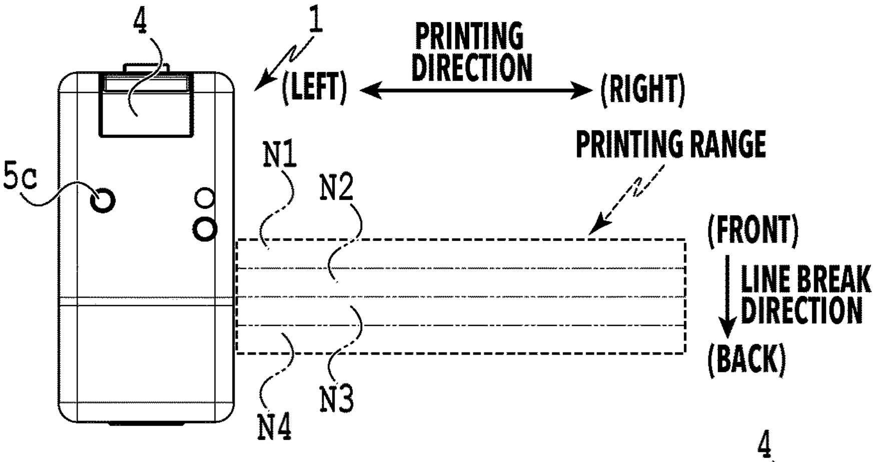
FIGS. 5A to 5D are views schematically illustrating a printing operation with the printer, according to one more embodiment of the subject innovation.

FIGS. 5A to 5D are schematic views illustrating a state where the printer 1 is placed on the print medium P as viewed from above. FIGS. 5A to 5D illustrate the printing operation over time. A printing range surrounded by the broken lines in FIG. 5A is the range of printing information to be printed, and band regions N1 to N4 each correspond to the width N of the nozzle array in the print head 6. Therefore, here, it is illustrated that the printing information sent to the printer 1 is the printing range for four lines on the print head 6.

FIG. 5A illustrates a state where the operator places the printer 1 at a printing start position, presses the printing start button 5*c*, and holds the printer 1 in a printing ready state. The state of the operator holding the printer 1 is a state of holding the printer so as to cover the upper surface of the upper cover 3*a* of the upper housing portion 3 with the operator's palm from above the printer 1 in use illustrated in FIG. 1. For example, in a case where the operator holds the printer with his/her right hand, the thumb is located on the left side of the printer 1 body, the index finger or the index finger and the middle finger are hung in front of the line break lever 4, and the remaining fingers are located on the right side of the printer 1 body. By holding the printer 1 in this way, the operator can stably hold the printer 1 and effortlessly scan the printer 1 in the printing direction. Further, in this holding state, the operator can smoothly perform the line break operation to be described later by using the index finger or the index finger and the middle finger. Of course, it suffices that the line break lever 4 be operable during the line break operation. Therefore, it is not necessary to always hang the index finger or the index finger and the middle finger on the line break lever 4. The index finger and the middle finger may hold an arbitrary position.

Figure 5B:
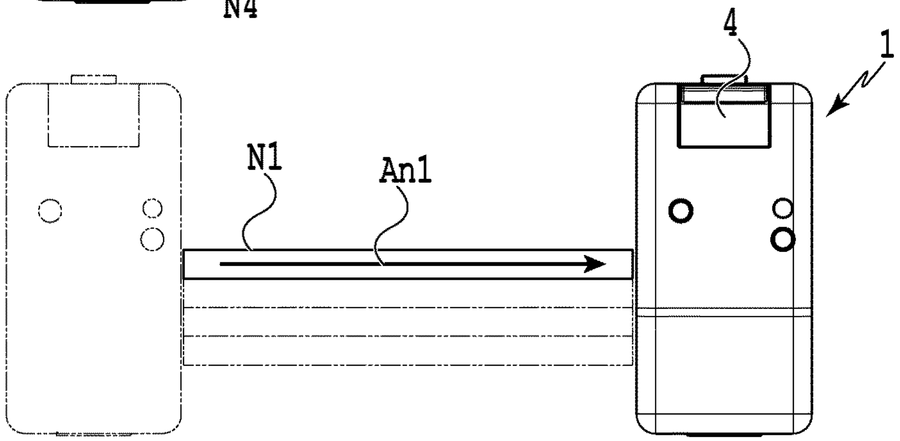

In a case where the operator scans the printer 1 body in the direction of the arrow An1 as illustrated in FIG. 5B in the state as described above, the printer 1 detects and calculates a moving amount of the printer 1 on the print medium P by using at least one of the tracking sensors 10 and 11. The tracking sensor 10 is a position detection sensor on the downstream side (line break side) in the line break direction. The tracking sensor 11 is a position detection sensor on the upstream side (previous line side) in the line break direction. By transmitting a drive signal for the print head 6 from the control unit not illustrated to the print head 6 according to the moving amount, the first line N1 is printed by the print head 6 in synchronization with a manual scan amount of the printer 1.

Upon completion of the printing of the first line N1, the printer 1 issues a notification that the printing of the first line is completed and a line break operation is ready to be started. The notification may be, for example, a change in blinking/lighting of an LED light on the printer 1, a change in color, a sound, a vibration, or the like. Further, any method may be used, such as performing a predetermined display on the information device side such as a personal computer or a smartphone transmitting printing information, instead of the printer 1.

Figure 5C:
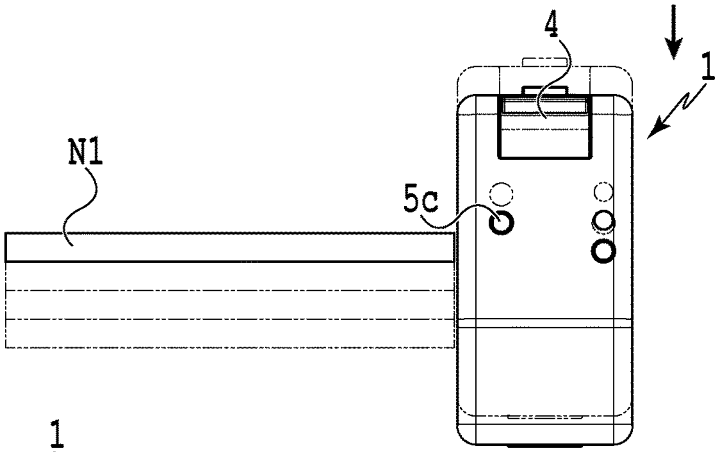

Upon receipt of the notification that the printing of the first line N1 is completed, the operator stops the scanning of the printer 1 in the direction of the arrow An1 (FIG. 5B). Thereafter, as illustrated in FIG. 5C, the operator pulls down the line break lever 4 with his/her finger in the line break direction to perform the line break operation to be described later. As a result of the line break operation, the printer 1 is moved in the line break direction by the width N of the printing nozzle array. By detecting the moving amount using at least one of the tracking sensors 10 and 11 for the line break operation, it is possible to automatically send a signal that printing of the next line is ready to be started after the line break operation is completed. Alternatively, it is also possible to shift to the state where printing of the next line is ready to be started, by the operator pressing the printing start button 5*c* again upon completion of the line break operation to notify the printer 1 or the information device of the state where the printing of the next line is ready to be started.

Figure 5D:
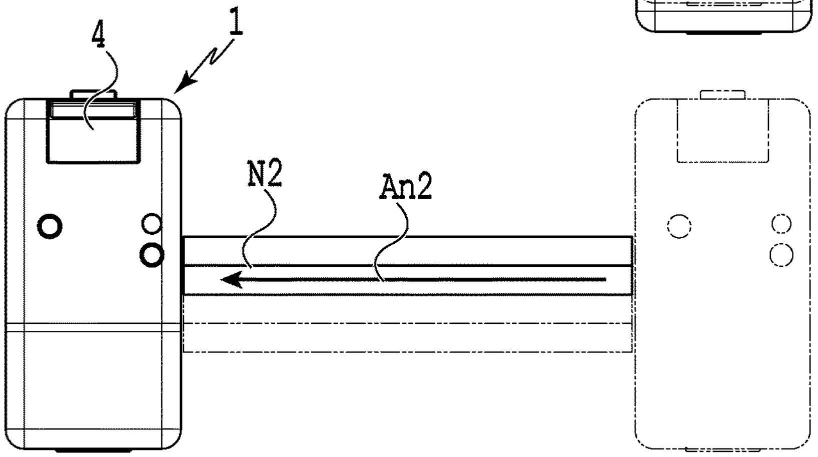

Then, as illustrated in FIG. 5D, the operator scans the printer 1 body in the direction of the arrow An2 to print the second line N2. Subsequently, the line break operation, printing of the third line N3, the line break operation, and printing of the fourth line N4 are performed in the same manner as described above. Thus, the printing operation in the printing range is completed.

Next, configurations of the respective components will be concretely described.

<First Guide Unit>

As illustrated in FIG. 2, the guide rollers 7L and 7R as the first guide unit are two roller members having two substantially parallel axes. In the guide rollers 7L and 7R, roller portions 7*a*, which are printing guide portions having substantially the same diameter, are integrally provided near both ends of shaft portions 7*b*, and are rotatably fixed to the lower case 2*a* of the lower housing portion 2. The roller portion 7*a* is formed of at least one of a material and a shape high in frictional resistance. Hereinafter, in the present specification, "L" suffixed to reference numerals represents members on the left side of the printer 1 body, while "R" represents members on the right side of the printer 1 body. If "L" or "R" suffixed to reference numerals is omitted, it is assumed that items corresponding to both left and right sides are described. Further, in the present specification, the up-down direction, left-right direction, and front-back direction (back is the line break direction) refer to the directions illustrated in the drawings.

The roller portions 7*a* of the guide rollers 7L and 7R protrude downward from the bottom surface of the printer 1 body and come into contact with the print medium P. Therefore, in a case where the operator manually scans the printer 1 during a printing operation, since the roller portions 7*a* are integrally provided with the guide rollers 7L and 7R, the roller portions 7*a* cannot rotate independently of the guide rollers 7L and 7R. Therefore, the printer 1 is guided linearly in the printing direction without rotating or obliquely traveling.

The guide rollers 7L and 7R have their rear end portions pressed forward by a spring 9 (see FIG. 6) via a support member 8 with a predetermined pressure. As a result, the shafts are fixed with respect to the lower case 2*a* without rattling, and misalignment of the print head 6 due to rattling can be suppressed, thus enabling accurate printing.

<Printing Unit>

As the printing unit of the present embodiment, an example of using an ink jet print head in which the printing unit does not come into contact with the print medium P will be described. However, a thermal transfer printing unit in which the printing unit comes into contact with the print medium P may also be used. Since the printer 1 of the present embodiment is a handheld printing apparatus, it is relatively easy to reduce the size and weight, and an example of using an ink jet printing method capable of printing in a reciprocating direction will be described.

As described above, on the nozzle surface 6*a* of the print head 6 (FIG. 2), the nozzle array including a plurality of nozzles for ejecting an ink is formed in a direction (front-back direction) substantially orthogonal to the printing direction. Printing is performed using the width N area of the nozzle array in the front-back direction. Printing is performed using a part or all of the nozzle array area.

As illustrated in FIGS. 2 and 3, the print head 6 is a cartridge-type print head in which the nozzle surface 6*a* having the nozzle array formed thereon and an ink tank containing an ink are integrated. As illustrated in FIG. 3, the print head 6 is inserted into the print head holding portion 12 with the lower and upper housing portions 2 and 3 open. By closing the upper housing portion 3, a pressing member 3*d* provided on the lower cover 3*b* of the upper housing portion 3 comes into contact with the print head 6, and the print head 6 is pressed against a positioning portion (not illustrated) of the print head holding portion 12 to have its position set and fixed. By positioning the print head 6 on the print head holding portion 12, an electrical contact portion (not illustrated) of the print head 6 is electrically connected to a contact portion (not illustrated) on the body side.

<Print Medium>

The print medium P used in the present embodiment is mainly a medium such as a paper sheet or note, but is not particularly limited to these as long as it is a medium on which printing can be performed by attaching an ink. The print medium may be any material as long as it accepts an ink, such as fabric, plastic film, sheet metal, glass, ceramic, wood, or leather.

<Tracking Sensor>

The tracking sensors 10 and 11 of the present embodiment are general optical tracking sensors that detect a mouse position used for a mouse or the like. The tracking sensors 10 and 11 irradiate the surface of the target medium (print medium P) with light emitted from a light source such as an LED or a laser, and calculate a moving amount of the sensors by photographing and observing the surface state of the irradiated area with an image pickup element once every short period of time.

The tracking sensors 10 and 11 each include: an electrical component provided with chips including an image pickup element not illustrated and a light source not illustrated; a light guide that guides light from the light source to the surface of the print medium P; a lens component for forming an image of a surface state of the print medium on the image pickup element; and the like. These components are housed in cases 10*a* and 11*a*, respectively. Further, the image pickup element, the light guide, and the lens component are arranged and fixed so that the surface of the print medium P can be irradiated with the light from the light source and photographed by the image pickup element through holes 10*b* and 11*b* provided in the cases 10*a* and 11*a*, respectively.

As the tracking sensors 10 and 11 used in the present embodiment, relatively high-precision sensors are used in order to realize high-definition printing quality. In order to use a high-precision sensor, it is required to keep the distance between the surface of the print medium P and the image pickup element with high accuracy. In the present embodiment, the cases 10*a* and 11*a* of the tracking sensors 10 and 11 are held swingably with respect to the printer 1, and sliding portions 10*c* and 11*c* of the cases 10*a* and 11*a* are configured to be pressed with a predetermined pressure so that the sliding portions slide on the surface of the print medium P. Thus, the tracking sensors 10 and 11 swing according to the surface condition such as unevenness of the print medium, making it possible to accurately keep the distance between the surface of the print medium P and the image pickup element. As a result, an accurate moving amount of the printer 1 can be obtained.

Even if the distance between the printer 1 and the surface of the print medium P changes during a line break operation to be described later, the tracking sensors 10 and 11 can slide on the surface of the print medium P. Therefore, the moving amount in the line break direction during the line break operation can also be accurately measured. This makes it possible to correct the distortion of a printed image due to a variation in line break amount.

Note that the tracking sensors 10 and 11 do not have to be the high-precision sensors as described above. In such a case, the restrictions on the distance between the surface of the print medium P and the image pickup element are relatively relaxed. Therefore, it is not necessary to provide a mechanism to allow the tracking sensors 10 and 11 to slide on the surface of the print medium. Instead, the tracking sensors 10 and 11 may be fixedly provided on the printer 1, making it possible to simplify the configuration.

In the present embodiment, description is given using an example where the tracking sensor is an optical sensor. However, as long as the moving amount of the printer 1 can be measured, an inertial sensor such as an acceleration sensor or a gyro sensor may also be used. Further, an apparatus for measuring the moving amount may be separately provided outside the printer 1, and the moving amount of the printer 1 may be transmitted to the printer 1 in real time. The printer 1 may perform printing control based on the transmitted moving amount. In this case, the printer 1 does not have to be provided with any sensors. If an external apparatus for measuring the moving amount is provided in a case or the like for accommodating the printer 1, it is not necessary to carry an apparatus for measuring the moving amount separately.

<Line Break Mechanism>

Figure 6:
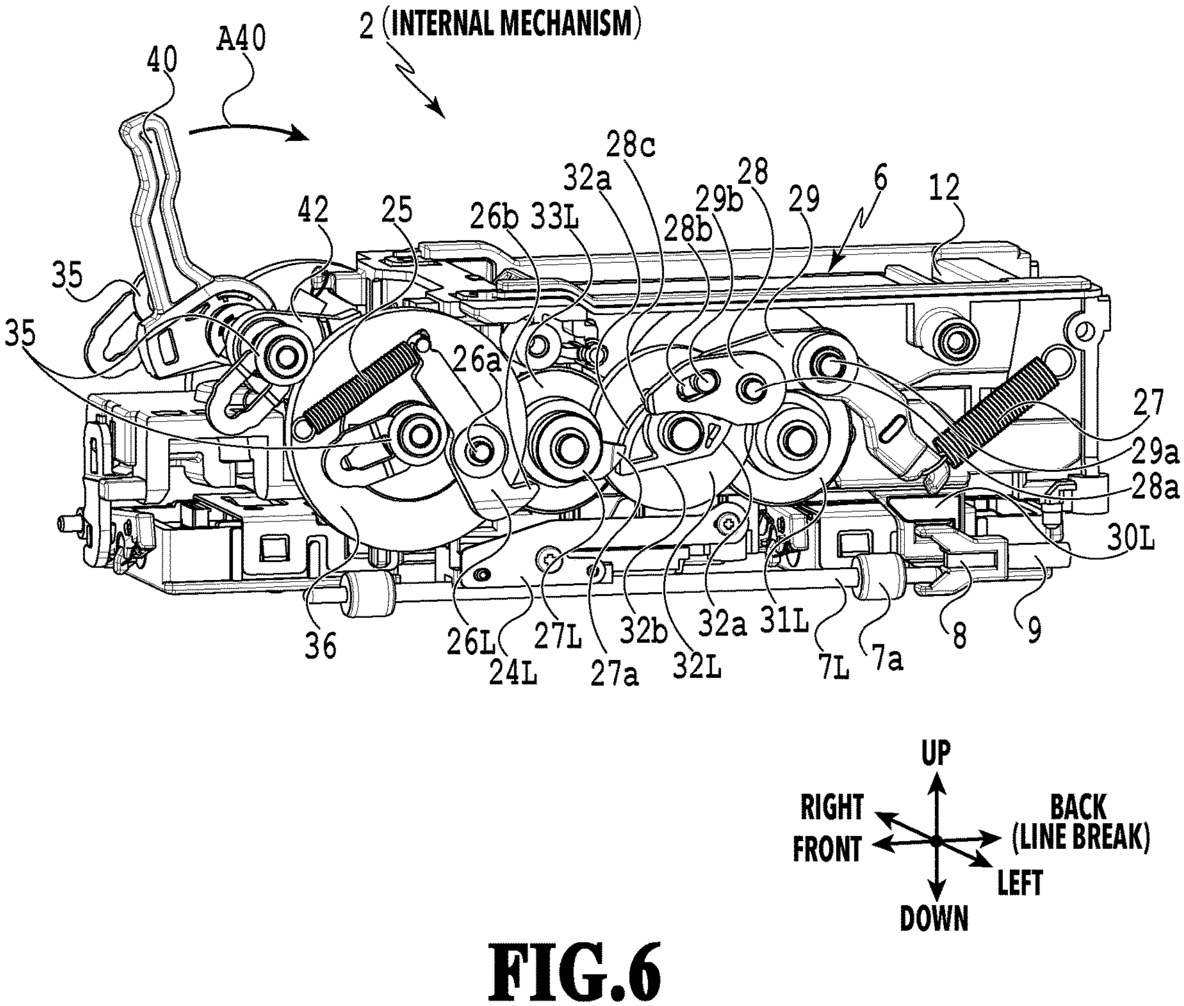
FIG. 6 is a left side perspective view of the inside of the lower housing portion as viewed from the left side, according to one more embodiment of the subject innovation.
Figure 7:
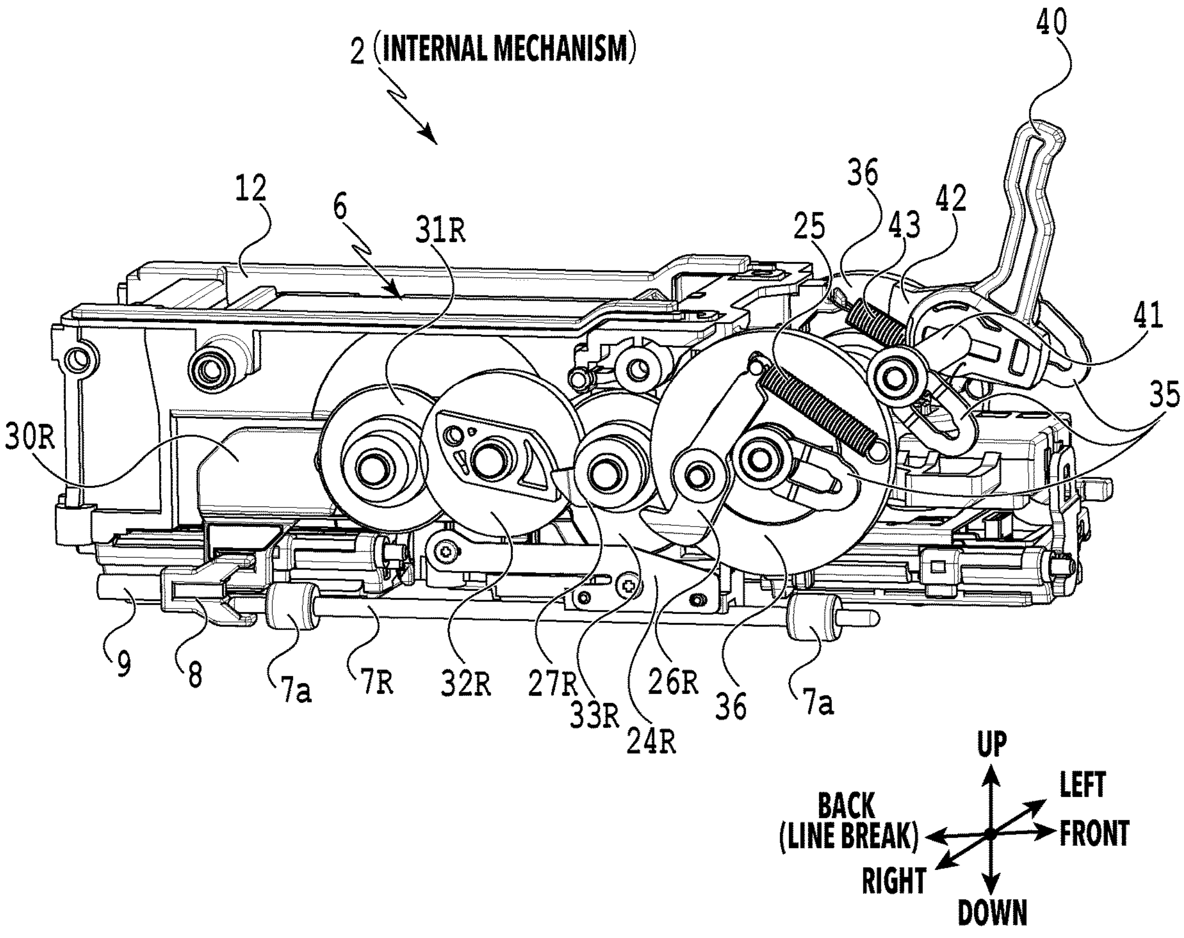
FIG. 7 is a right side perspective view of the inside of the lower housing portion as viewed from the right side, according to one more embodiment of the subject innovation.
Figure 8:
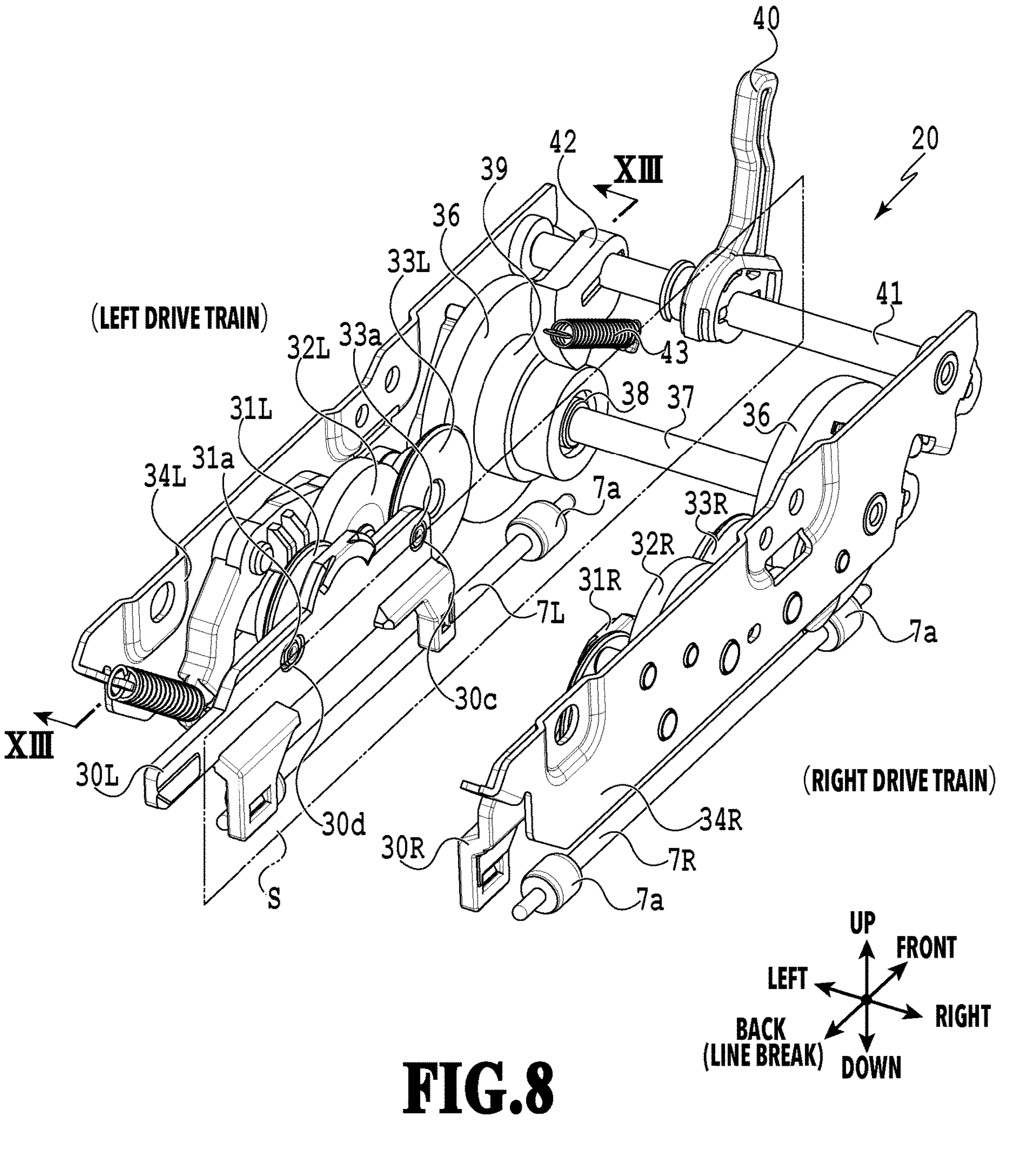
FIG. 8 is a perspective view of a line break mechanism inside the lower housing portion as viewed from the right rear side, according to one more embodiment of the subject innovation.

Next, the configuration and operations of the line break mechanism 20 in the present embodiment will be described with reference to FIGS. 6 to 11D. FIG. 6 is a left side perspective view of the inside of the lower housing portion 2 as viewed from the left side. FIG. 7 is a right side perspective view of the inside of the lower housing portion 2 as viewed from the right side. FIG. 8 is a perspective view of the printer 1 as viewed from the right rear side, illustrating a portion extracted for the line break mechanism 20 inside the lower housing portion 2. FIGS. 9A to 9H are left side views for explaining a driving operation of the line break mechanism 20. FIGS. 10A to 10D are right side views of the line break mechanism 20 illustrated in FIGS. 9A to 9H as viewed from the right side. FIGS. 11A to 11D are left side views of the printer 1 body for explaining a line break operation of the printer by the driving operation of the line break mechanism 20.

First, the internal configuration of the lower housing portion 2 will be described with reference to FIGS. 6 to 8 as appropriate. The print head holding portion 12 is a box-shaped structure that holds the print head 6 as described above and includes an electric contact point not illustrated. The print head holding portion 12 that is a box-shaped structure is provided with an opening for detachably mounting the print head 6 on the upper side and an opening in which the nozzle surface 6*a* faces the print medium P on the lower side. Holding sheet metals 34L and 34R for holding the line break mechanism 20 illustrated in FIG. 8 are fixed with screws or the like to both sides of the print head holding portion 12 in the left-right direction. A plurality of shaft parts serving as rotation shafts of gears and levers, which are components of the line break mechanism 20, are fixed to the holding sheet metals 34L and 34R by caulking.

As described above, the drive lever 40 is configured to engage with the line break lever 4. The drive lever 40 is operated in the direction of the arrow A40 by the operator pulling the line break lever 4. The drive lever 40 is integrally fixed to a shaft 41, and a fan-shaped gear 42 is similarly integrally fixed to the shaft 41. The shaft 41 has its both ends rotatably supported by holding sheet metals 34L and 34R via bearings 35. Further, a spring 43 is stretched between the fan-shaped gear 42 and the print head holding portion 12 (box-shaped structure). The spring 43 biases the drive lever 40 in a direction opposite to the direction of the arrow A40, and in a case where no external force is applied to the drive lever 40, the drive lever 40 is positioned at an abutting position (initial position) of the cover or the like.

The fan-shaped gear 42 is connected to a gear 39, and the gear 39 is pivotally supported by a shaft 37 via a one-way clutch 38. The one-way clutch 38 is a clutch member configured to transmit driving force in a case where the drive lever 40 is moved in the direction of the arrow A40 to the shaft 37, and idle if the drive lever 40 is moved in the direction opposite to the direction of the arrow A40. Gears 36 having the same phase and the same phase are integrally fixed near both ends of the shaft 37, and both ends are rotatably supported by holding sheet metals 34L and 34R via bearings 35.

The gear 36 is connected to a first guide plate drive gear 33L on the left side of the printer 1 body. The first guide plate drive gear 33L is connected to an idler gear 32L. The idler gear 32L is connected to a second guide plate drive gear 31L. That is, the first guide plate drive gear 33L, the idler gear 32L, and the second guide plate drive gear 31L are connected in order from the gear 36. The first and second guide plate drive gears 33L and 31L have the same number of gear teeth. The number of teeth of the idler gear 32L is twice the number of teeth of the first guide plate drive gear 33L (or the second guide plate drive gear 31L). Therefore, the first and second guide plate drive gears 33L and 31L rotate at the same speed and in the same phase.

The first guide plate drive gear 33L is provided with a first boss 33*a*. The second guide plate drive gear 31L is provided with a second boss 31*a*. The first and second bosses 33*a* and 31*a* are provided to have the same distance and angular phase from the center of rotation of each gear. The first and second bosses 33*a* and 31*a* are assembled so that the line connecting the center lines thereof (corresponding to the line 30*e* in FIG. 10A) is substantially horizontal. Therefore, in a case where the first and second guide plate drive gears 33L and 31L are driven, the first and second bosses 33*a* and 31*a* rotate while maintaining the line connecting the center lines thereof at a substantially horizontal position.

Note that "horizontal" here does not mean "horizontal" with respect to a general ground, but "horizontal" with respect to the posture of the printer 1. This is because the printer 1 of the present embodiment changes its posture depending on the state of the print medium P. Therefore, the posture of the printer 1 with the roller portion 7*a* in contact with the print medium P serves as a horizontal reference. Therefore, a plane B defined by the lower ends of the roller portions 7*a* of the guide rollers 7L and 7R and indicated by the broken line in FIGS. 9A to 9H is set as a reference (horizontal plane), and a state of being parallel to the reference horizontal plane B is referred to as "horizontal". Further, since the roller portions 7*a* have substantially the same outer diameter, it can be defined that the shaft center lines of the guide rollers 7L and 7R are also horizontal. Also, being parallel to the shaft center line of the guide roller 7L or 7R can also be said as horizontal.

A rotation shaft hole 30*c* of the guide plate 30L is rotatably supported on the first boss 33*a* of the first guide plate drive gear 33L. An oblong hole 30*d* of the guide plate 30L is rotatably engaged with the second boss 31*a* of the second guide plate drive gear 31L. Further, the rotation shaft hole 30*c* and the oblong hole 30*d* of the guide plate L30 have their center lines provided at linear positions, and as described above, the first and second bosses 33*a* and 31*a* rotate while being maintained in a substantially horizontal position. Therefore, the guide plate L30 also rotates while being maintained in a substantially horizontal position. The oblong hole 30*d* is formed to be longer than the rotation shaft hole 30*c* in order to prevent inconsistencies in dimensional accuracy. Thus, the outline of the left drive train has been described.

As illustrated in FIG. 7, the gear 36 is connected to a drive train on the right side of the printer 1 body in the same manner as the left drive train described above. The gears 36, 33L, 32L, and 31L in the drive train on the left side of the printer 1 body and gears 36, 33R, 32R, and 31R in the drive train on the right side of the body are configured in a plane-symmetrical relationship with respect to a plane S passing through the central portion of the body indicated by the chain double-dashed line in FIG. 8. That is, the number of teeth of the gear, the phase of the teeth, the position of the rotation axis of the gear, and the positions of the first and second bosses 33*a* and 31*a* on the first and second guide plate drive gears 33R and 31R are configured in a plane-symmetrical relationship. Since the right drive train is connected to the left drive train via the shaft 37 and the gear 36, the right drive train moves in the same manner (plane symmetry) in synchronization with the left drive train. Therefore, the operation will be described in detail by taking the left side as an example, and description of the right side will be omitted.

Next, the operation of the left drive train in the line break mechanism 20 will be described with reference to FIGS. 9A to 9H and the like. FIGS. 9A to 9H illustrate states of the left drive train in chronological order. In the present specification, the state of FIG. 9A will be referred to as a state A, the state of FIG. 9B will be referred to as a state B, and the state of FIG. 9C will be referred to as a state C, and the like as appropriate. Further, states illustrated in FIGS. 10A to 10D and 11A to 11D correspond to the states of FIGS. 9A to 9H, respectively.

Figure 9A:
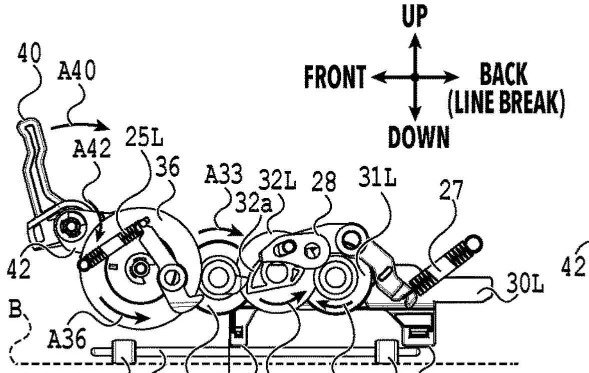
FIGS. 9A to 9H are left side views for explaining a driving operation of the line break mechanism, according to one more embodiment of the subject innovation.
Figure 10A:
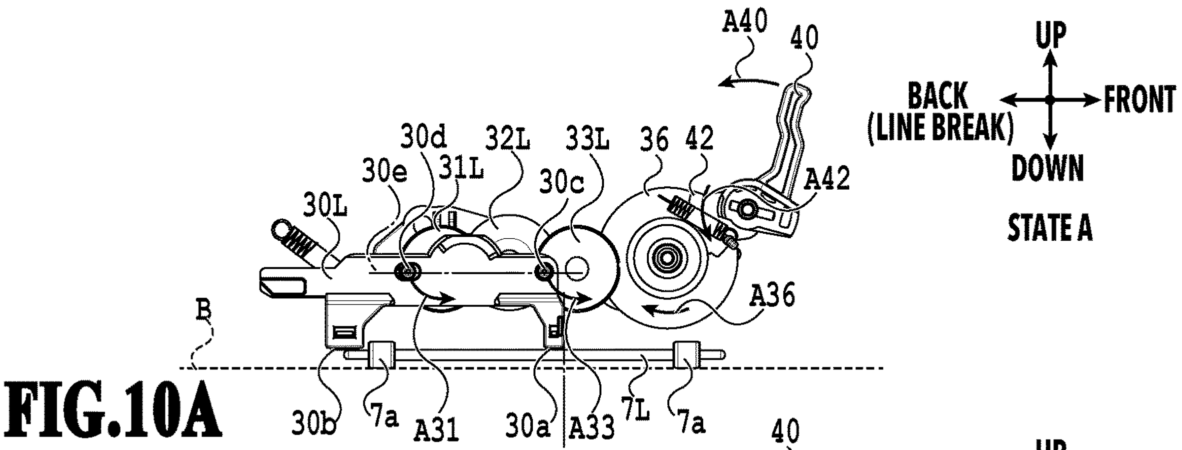
FIGS. 10A to 10D are right side views of the line break mechanism as viewed from the right side, according to one more embodiment of the subject innovation.

FIG. 9A illustrates a state (state A) of the left drive train in a standby state (initial state) before line break drive. In a case where the operator pulls the line break lever 4 in this state, the drive lever 40 swings in the direction of the arrow A40 to drive the drive train. The fan-shaped gear 42 rotates in the direction of the arrow A42, the gear 36 rotates in the direction of the arrow A36, the first guide plate drive gear 33L rotates in the direction of the arrow A33, the idler gear 32L rotates in the direction of the arrow A32, and the second guide plate drive gear 31L rotates in the direction of the arrow A31. The positional relationship between the first and second bosses 33*a* and 31*a* on the first and second guide plate drive gears 33L and 31L and the guide plate 30L in this event is as illustrated in FIG. 10A. As described above, the line 30*e* connecting the center lines of the rotation shaft hole 30*c* and the oblong hole 30*d* (first boss 33*a* and second boss 31*a*) of the guide plate 30L is substantially horizontal.

On the lower end surface of the guide plate 30L, a first contact portion 30*a* and a second contact portion 30*b* are provided, respectively, which come into contact with the print medium P during a line break operation. The first and second contact portions 30*a* and 30*b* are provided such that a height relationship therebetween is substantially parallel to the line 30*e*. Therefore, in a case where the guide plate 30L is driven, the first and second contact portions 30*a* and 30*b* rotate in synchronization with the rotation of the first and second guide plate drive gears 33L and 31L while maintaining the horizontal position. These contact portions play a role like legs during a line break operation. Therefore, the contact portions may also be referred to as line break legs. Likewise, a first contact portion 30*a* and a second contact portion 30*b* are also provided on the lower end surface of the guide plate 30R. As illustrated in FIG. 2, the first and second contact portions 30*a* and 30*b* are provided at positions where the portions come into contact with the print medium P outside the printing range of the print head 6 in a printing scan just before movement in the line break direction.

Figure 9B:
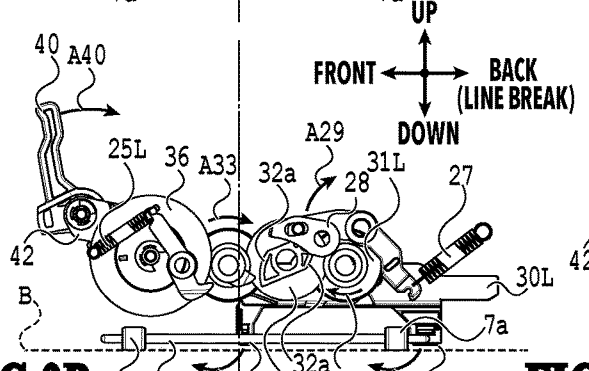

As the operation of the drive lever 40 advances to the position of the state B in FIG. 9B, the positions of the first and second bosses 33*a* and 31*a* are lowered due to the rotation of the first and second guide plate drive gears 33L and 31L, and the position of the guide plate 30L is also lowered. As the operation further advances to the state illustrated in FIG. 9C (state C illustrated in FIG. 10B), the first and second contact portions 30*a* and 30*b* of the guide plate 30L reach the plane B that is the height of the contact surface between the print medium P and the roller portion 7*a*. As the operation of the drive lever 40 further proceeds, the first and second contact portions 30*a* and 30*b* of the guide plate 30 move to below the plane B that is the height of the contact surface between the print medium P and the roller portion 7*a*. Then, as the position illustrated in FIG. 9D (state D illustrated in FIG. 10C) is reached, the first and second bosses 33*a* and 31*a* reach the lowest positions on their gears, respectively. Thus, the first and second contact portions 30*a* and 30*b* also reach the lowest position during the line break drive. Thereafter, as the drive proceeds, the first and second bosses 33*a* and 31*a* are positioned in an upward direction, and thus the guide plate 30L is also lifted.

Figure 9C:
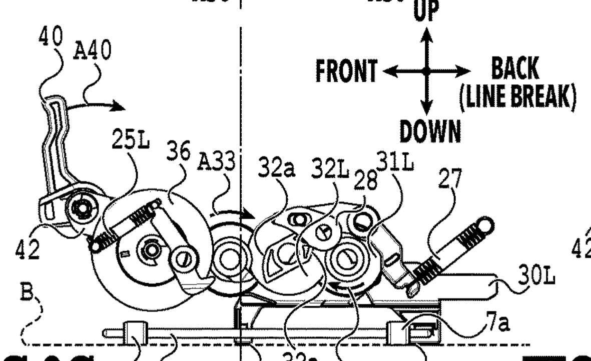
Figure 9D:
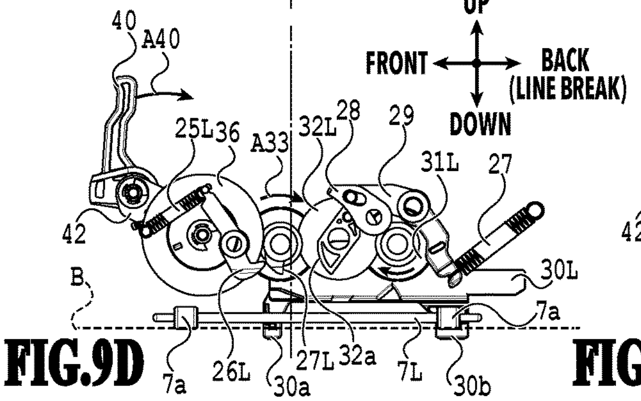
Figure 9E:
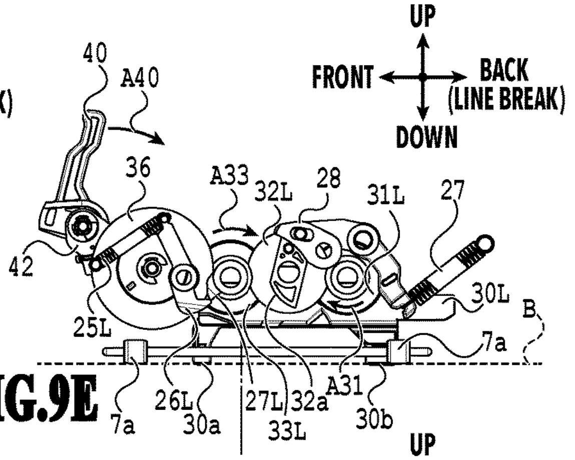

The operation of the drive lever 40 further proceeds to reach the position of the state E illustrated in FIG. 9E. This state E is the operation completion position of the drive lever 40 (line break lever 4) in the present embodiment, and the drive lever 40 abuts against an abutting portion not illustrated and stops. In this state E, it is assumed that the first and second contact portions 30*a* and 30*b* of the guide plate 30L are located slightly below the plane B. If the drive by the drive lever 40 ends at this point, the first guide plate drive gears 33L and 33R and the guide plates 30L and 30R cannot be driven any more and stop at this position, which hinders the next line break drive.

Figure 9F:
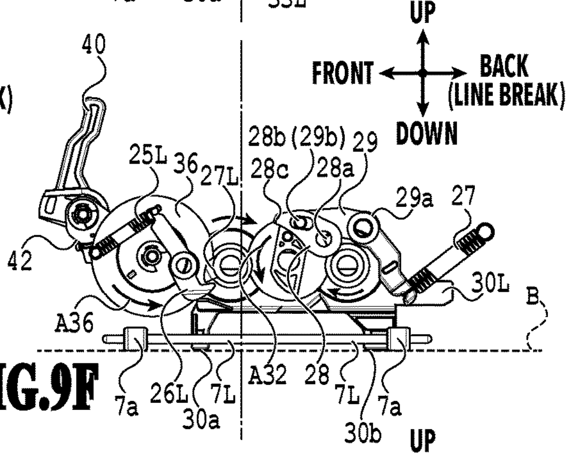
Figure 9G:
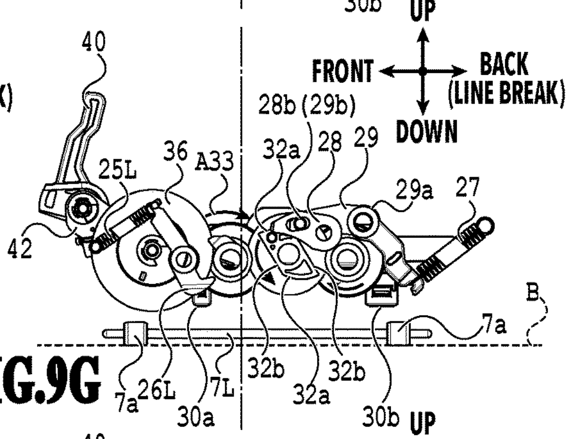
Figure 9H:
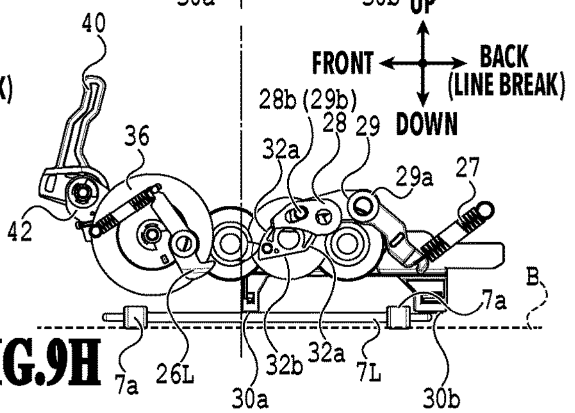

Therefore, in the present embodiment, the first and second guide plate drive gears 33L and 31L are driven from the state E in FIG. 9E to the state H of FIG. 9H that is the line break drive completion state, which is the same as the standby state (state A) before the line break drive in FIG. 9A. In the present embodiment, a reset mechanism is provided to perform drive control for returning to the standby state as described above.

<Reset Mechanism>

The reset mechanism will be described. As illustrated in FIG. 6, the reset mechanism includes a first reset lever 29, a second reset lever 28, and a reset lever spring 27. The idler gear 32L is rotated by pressing a cam surface 32*a* integrally provided with the idler gear 32L by the first and second reset levers 29 and 28. Thus, by rotating the idler gear 32L, an operation of returning the first and second guide plate drive gears 33L and 31L to their initial positions is performed.

The reset mechanism will be described with reference to FIGS. 6, 9A to 9H, 12A to 12D, and 13A to 13D. FIGS. 12A to 12D are views illustrating a reset operation by the reset mechanism and is a perspective view of the line break mechanism 20 as viewed from the left front side. FIGS. 13A to 13D are cross-sectional views taken along the line XIII in FIG. 8. The states illustrated in FIGS. 12A to 12D and 13A to 13D correspond to the states of FIGS. 9A to 9H.

As illustrated in FIG. 6, the first reset lever 29 is rotatably supported by a rotation hole 29*a* with respect to a shaft fixed to the holding sheet metal 34L. Likewise, the second reset lever 28 is also rotatably supported by a rotation hole 28*a* with respect to a shaft fixed to the holding sheet metal 34L. Further, a boss 29*b* provided near the tip of the first reset lever 29 is slidably and loosely fitted into a long hole portion 28*b* provided in the second reset lever 28. Therefore, the first reset lever 29 swings around the rotation hole 29*a* so that the second reset lever 28 swings around the rotation hole 28*a*. The reset lever spring 27 for biasing the tip of the first reset lever 29 toward the idler gear 32L is stretched between the first reset lever 29 and the holding sheet metal 34L.

Further, the idler gear 32L is provided with a convex shape including the cam surface 32*a* and a plane portion 32*b* on the surface corresponding to the first and second reset levers 29 and 28. In this convex shape, the cam surface 32*a* and the plane portion 32*b* are provided on both sides of the rotation center of the idler gear 32L. This convex shape is substantially point-symmetrical with respect to the center of rotation of the idler gear 32L.

The position of the reset mechanism in the standby state (state A) illustrated in FIGS. 6, 9A, 12A, and 13A will be described. In the state A, the first and second reset levers 29 and 28 come into contact with or are located with a slight gap with the plane portion 32*b* of the convex shape of the idler gear 32L, thereby defining the position of the idler gear 32L. Further, by defining the position of the idler gear 32L, the standby (initial) positions of the first guide plate drive gears 33L and 31L and the guide plate 30L are defined.

Figure 12A:
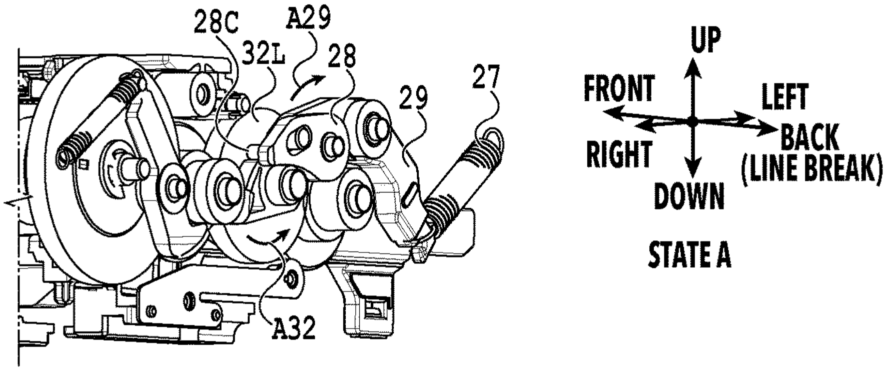
FIGS. 12A to 12D are views illustrating a reset operation by the reset mechanism, according to one more embodiment of the subject innovation.
Figure 12B:
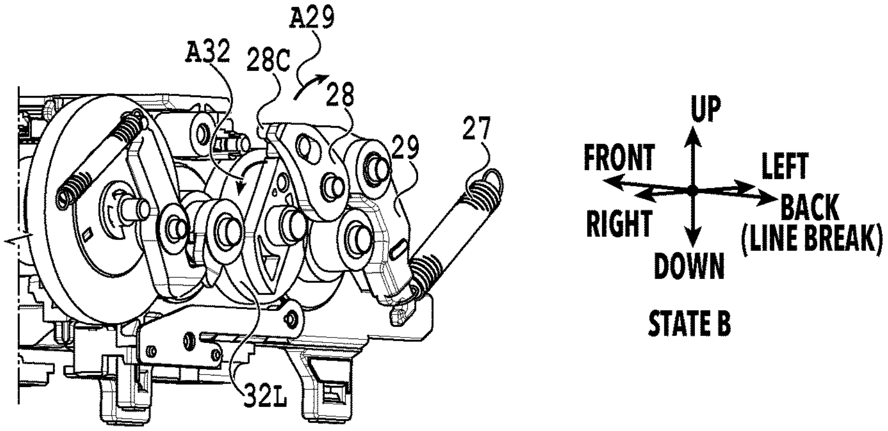
Figure 13A:
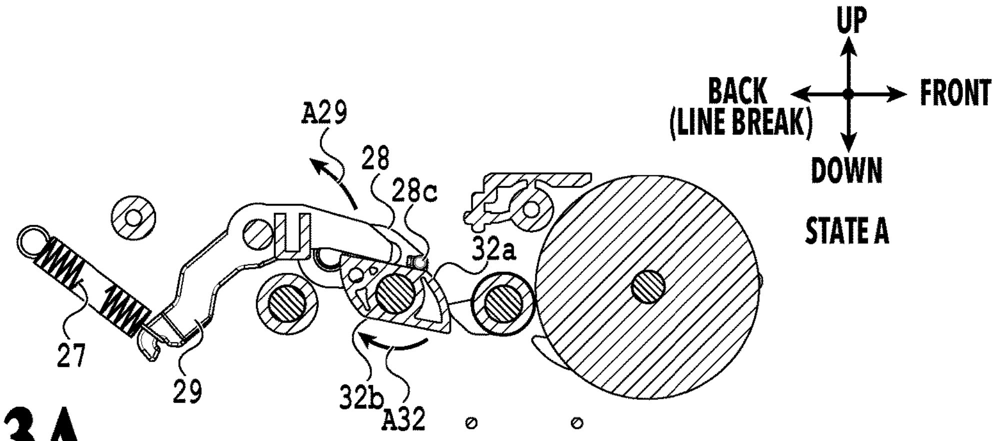
FIGS. 13A to 13D are cross-sectional views taken along the XIII cross-sectional line of FIG. 8, according to one more embodiment of the subject innovation.
Figure 13B:
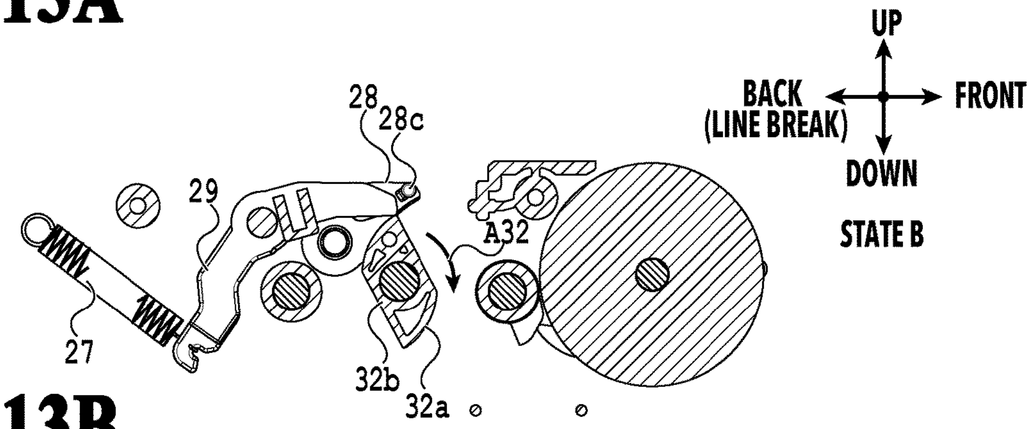

In the state A of FIGS. 9A, 12A, and 13A, as the idler gear 32L is rotated in the direction of the arrow A32 by the operation of the drive lever 40, the intersection point between the cam surface 32*a* and the plane portion 32*b* of the convex shape hits against the first reset lever 29. Then, as illustrated in FIGS. 9B, 12B, and 13B, the first reset lever 29 swings in the direction of the arrow A29, and the second reset lever 28 also swings accordingly. Thereafter, as the drive proceeds to the point between FIGS. 9D and 9E, the intersection point between the cam surface 32*a* and the plane portion 32*b* of the convex shape of the idler gear 32L goes beyond the tip of the first reset lever 29. Then, the tip of the first reset lever 29 slides against the cam surface 32*a* by the spring force of the reset lever spring 27. The cam surface 32*a* has such a shape as to rotate the idler gear 32L in the direction of the arrow A32 by being pushed by the tip of the first reset lever 29 or a tip portion 28*c* of the second reset lever 28. Thus, after the operation by the drive lever 40 (line break lever 4) in FIG. 9E is completed, the idler gear 32L is rotated by the first and second reset levers 29 and 28. That is, it is possible to shift from the state of FIG. 9F to the state of FIG. 9H regardless of the operation by the drive lever 40. More specifically, in the state from FIG. 9A to FIG. 9E, the idler gear 32L is rotated in the direction of the arrow A32 by the operation of the drive lever 40. Thereafter, the idler gear 32L is continuously rotated in the direction of the arrow A32 by the reset mechanism. Then, as the idler gear 32L is rotated from the state A of FIG. 9A, the position of the state H illustrated in FIG. 9H is reached.

FIG. 9F illustrates a state where the first and second contact portions 30*a* and 30*b* of the guide plate L30 have reached the plane B again. As described above, the state E illustrated in FIG. 9E is the operation completion position of the drive lever 40 (line break lever 4). In this state E, the first and second contact portions 30*a* and 30*b* of the guide plate 30L are located slightly below the plane B. In the state F illustrated in FIG. 9F, the idler gear 32L is slightly rotated by the action of the reset mechanism from the state E, whereby the first and second contact portions 30*a* and 30*b* of the guide plate 30L have reached the plane B again.

Figure 12C:
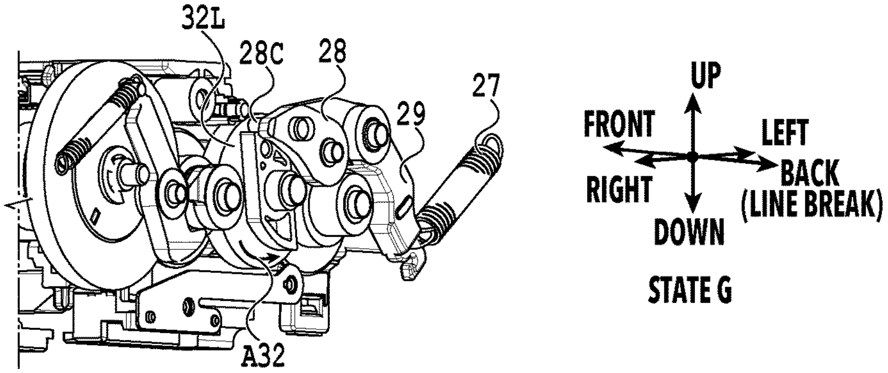
Figure 12D:
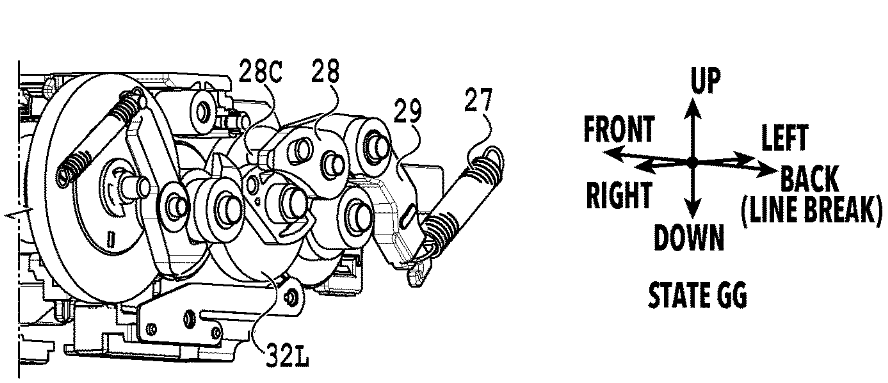
Figure 13C:
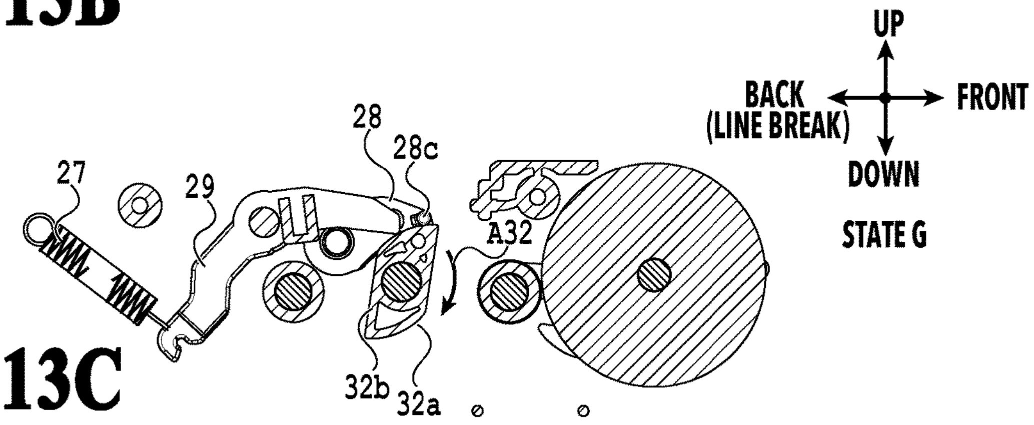
Figure 13D:
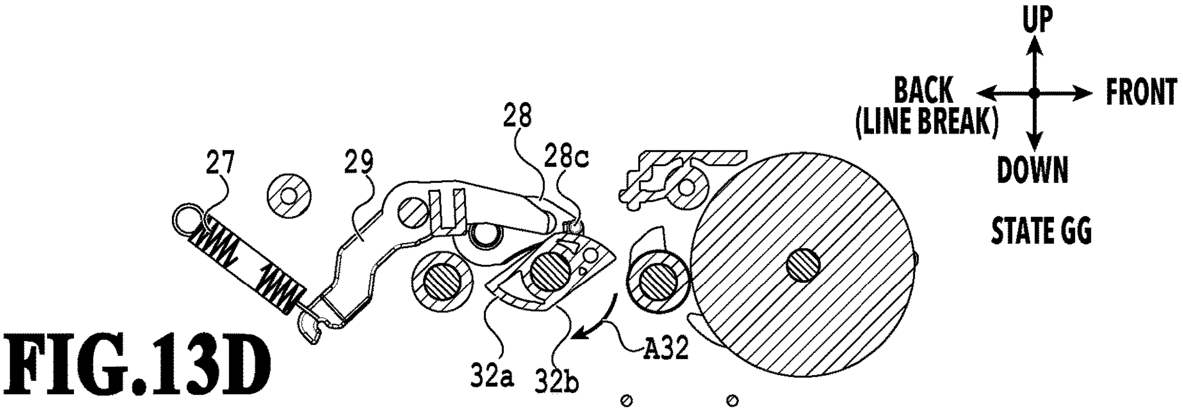

As described above, FIG. 9H illustrates a state (state H) where the line break drive is completed. FIG. 9G illustrates a state (state G) in the middle of transition from FIG. 9F to FIG. 9H. The idler gear 32L is rotated by the first reset lever 29 from the state F of FIG. 9F to reach the state between FIGS. 9F and 9G. Then, the intersection point between the cam surface 32*a* and the plane portion 32*b* of the convex shape of the idler gear 32L goes beyond the tip portion 28*c* of the second reset lever 28, and the tip portion 28*c* of the second reset lever 28 slides against the cam surface 32*a* around the state G of FIG. 9G (FIG. 12C and FIG. 13C). The tip portion 28*c* of the second reset lever 28 is a protrusion that protrudes toward the convex shape of the idler gear 32L. In the second reset lever 28, the tip portion 28*c* can slide against the cam surface 32*a* and the plane portion 32*b* of the idler gear 32L. After the state G, the idler gear L32 is rotated by the tip portion 28*c* of the second reset lever 28. The state GG illustrated in FIGS. 12D and 13D illustrates a state where the idler gear L32 is further rotated by the tip portion 28*c* of the second reset lever 28 from the state G. Then, as the state of FIG. 9H (state H) where the line break drive is completed is reached, the position of the idler gear 32L is determined by the first and second reset levers 29 and 28, as in the standby state of FIG. 9A. Then, as the position of the idler gear 32L is defined, the guide plate 30 returns to the standby (initial) state.

Note that FIGS. 9F to 9H illustrate a state where the operator keeps pulling the line break lever 4 (drive lever 40). As illustrated in FIGS. 9F to 9H, even if the operator keeps pulling the line break lever 4 (drive lever 40), the gear 36 can be rotated in the direction of the arrow A36 by the action of the one-way clutch 38. Therefore, the operation of the line break lever 4 by the operator does not hinder the rotation of the drive train by the reset mechanism. Further, if the operator stops pulling the line break lever 4 in the state of FIG. 9H, the drive lever 40 can be returned to the initial position illustrated in FIG. 9A by the force of the spring 43.

In the present embodiment, a description has been given of an example where the reset mechanism includes two levers, the first and second reset levers 29 and 28. The reason for providing such two levers is to reduce the amount of upward protrusion in a case where the first reset lever 29 is swung by the convex shape of the idler gear 32. Therefore, if there is no size limitation, the reset mechanism may be configured using only the long first reset lever 29. Further, in the present embodiment, a description has been given of an example where the reset mechanism is provided on the left side of the printer 1 body (line break mechanism 20), but the reset mechanism may be provided on the right side.

Thus, the main configuration of the line break mechanism has been described above. The relationship between the operation amount of the drive lever 40 (line break lever 4) and the rotation amount of the first and second guide plate drive gears 33L and 33R in the drive train described above may be appropriately determined. For example, the gear ratio of each gear can be determined as appropriate based on the operation amount of the drive lever 40 (line break lever 4) that can be operated in terms of configuration and the drive amount of the first guide plate drive gears 33L and 33R or the guide plate L30 that the operator wishes to operate. More specifically, it is possible to appropriately determine the gear ratios of the fan-shaped gear 42, the gear 39, the gear 36, and the gear 33 (31). In a case where the rotation amount of the first guide plate drive gear 33 is increased with a small operation amount of the drive lever 40 (line break lever 4), it is necessary to significantly increase the gear ratio. In this case, the operation force of the line break lever 4 is increased, and the operation by the operator may become difficult. Therefore, it is preferable to determine the gear ratio in consideration of the operating force of the operator. In the present embodiment, a description has been given using an example where the gear ratio is increased by about 4 times and the drive amount illustrated in FIGS. 9A to 9E is secured.

<Printer Line Break Operation>

Next, the line break operation of the printer 1 by the drive operation of the line break mechanism 20 described above will be described with reference to FIGS. 9A to 11D and 14A to 14C. FIGS. 11A to 11D are side views of the printer body for explaining the line break operation of the printer 1 during a printing operation by the drive operation of the line break mechanism 20. For convenience of explanation, FIGS. 11A to 11D illustrate a state where the lower case 2*a* of the lower housing portion 2 is partially cut so that the internal mechanism can be seen.

Figure 11A:
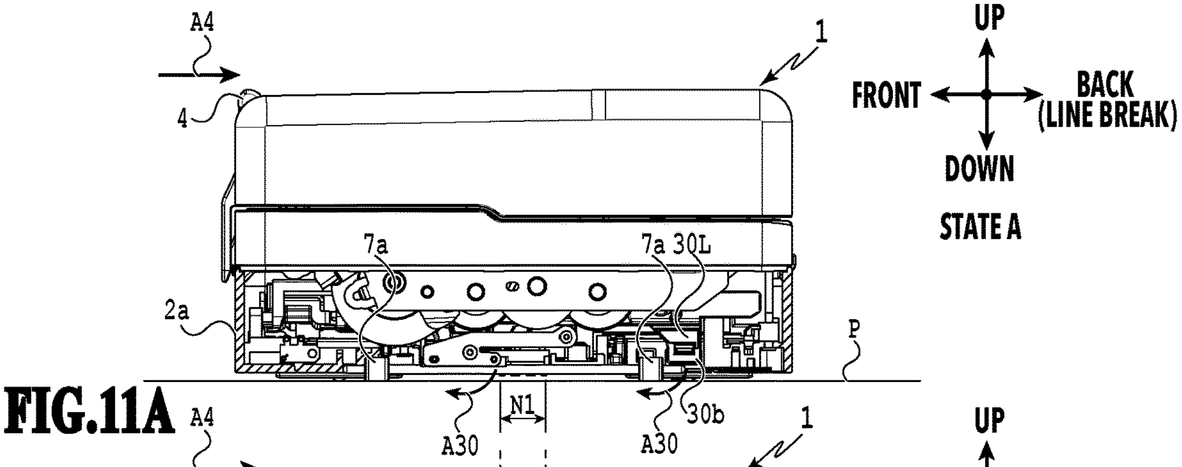
FIGS. 11A to 11D are left side views illustrating a line break operation of the printer by the driving operation of the line break mechanism, according to one more embodiment of the subject innovation.

FIG. 11A illustrates a state (state A) just before a line break operation, in which the printing of the first line N1 is completed and the printer 1 is stopped, as described in FIG. 5B. As the operator pulls the line break lever 4 in the direction of the arrow A4 in this state, driving of the line break mechanism is started, and the line break operation is performed accordingly.

Figure 10B:
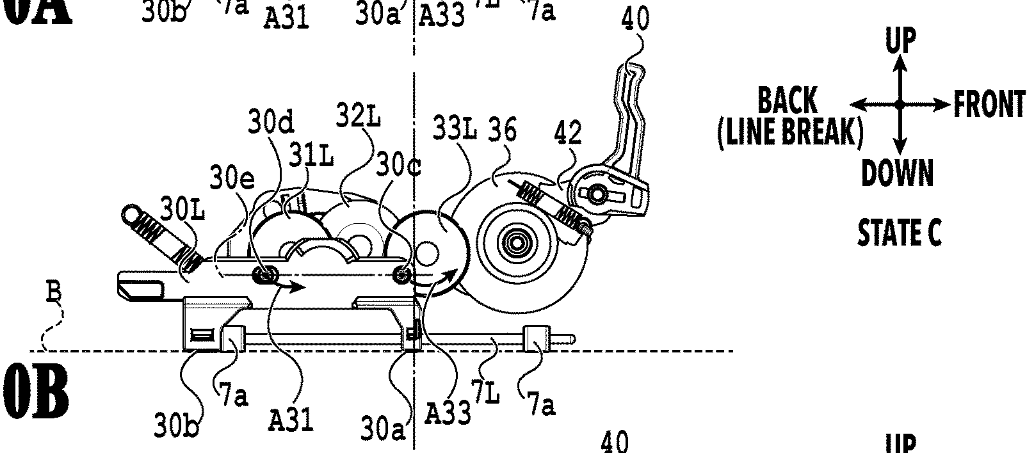
Figure 11B:
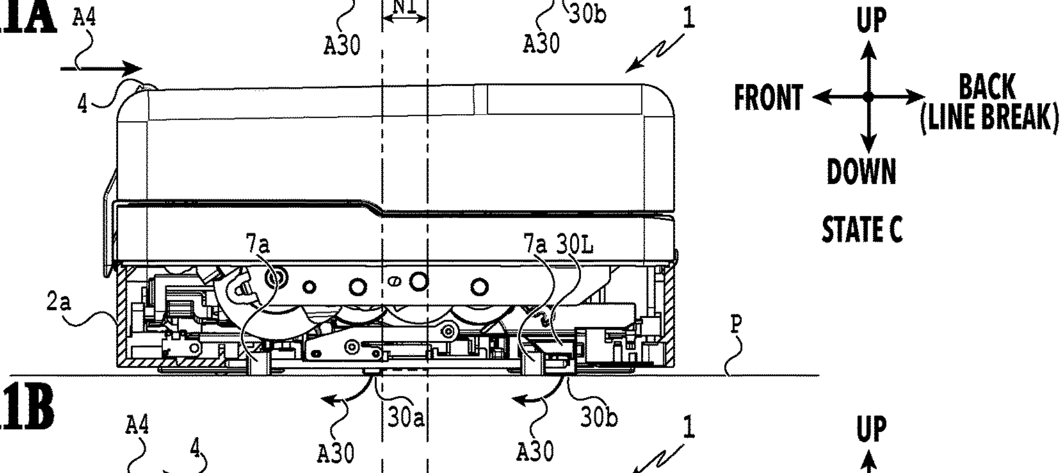

FIG. 11B is a view of the state C illustrated in FIGS. 9C and 10B described above. The first and second contact portions 30*a* and 30*b* of the guide plate 30L in the middle of operation of the line break lever 4 by the operator are rotated in the direction of the arrow A30. That is, the first and second contact portions 30*a* and 30*b* are rotated in the direction of the arrow A30 by the movement of the first and second bosses 33*a* and 31*a* of the first and second guide plate drive gears 33L and 31L. In the state C illustrated in FIG. 11B, the first and second contact portions 30*a* and 30*b* have reached the plane B that is the height of the contact surface between the print medium P and the roller portion 7*a*. That is, FIG. 11B illustrates a state where the first and second contact portions 30*a* and 30*b* are in contact with the print medium P.

Here, the roller portion 7*a* and the first and second contact portions 30*a* and 30*b* are provided so as to come into contact with the print medium P outside the printing range N1. This is because, in an ink jet printing method, ink droplets may remain on a paper surface in a printing area immediately after printing. If the roller portion 7*a*, the first contact portion 30*a*, or the second contact portion 30*b* touches the ink droplet, the ink may be transferred to the roller portion 7*a*, the first contact portion 30*a*, or the second contact portion 30*b*. Then, the transferred ink may be transferred again to the printed surface via the roller portion 7*a*, the first contact portion 30*a*, or the second contact portion 30*b*, resulting in contamination of the printed surface. In order to prevent such contamination of the printed surface of the print medium P, the roller portion 7*a* and the first and second contact portions 30*a* and 30*b* are configured so as to come into contact with the print medium P outside the printing range N1. By using a quick-drying ink or a highly permeable ink, ink droplets may be prevented from remaining in the printing area immediately after printing. Further, the roller portion 7*a* and the first and second contact portions 30*a* and 30*b* may be made water repellent to make it difficult for the ink to be transferred to the surface. Thus, the printed surface may be prevented from being contaminated by the ink transferred even in a case of contact with the printing area immediately after printing. In consideration of certainty, it is preferable that the roller portion 7*a* and the first and second contact portions 30*a* and 30*b* do not come into contact with the printing area immediately after printing.

As the operator further operates the line break lever 4 from the state C of FIG. 11B, the first and second contact portions 30*a* and 30*b* move to below the plane B as described above during the driving of the line break mechanism from FIG. 9C to FIG. 9D described above. However, in the transition from the state C of FIG. 11B to the state D of FIG. 11C, the first and second contact portions 30*a* and 30*b* cannot move any further down due to the presence of the print medium P (ground). Therefore, after the first and second contact portions 30*a* and 30*b* have come into contact with the print medium, the first and second contact portions 30*a* and 30*b* serve as fixed base points on the print medium P. That is, the first and second guide plate drive gears 33L and 31L rotate while the guide plate 30L is stopped. In other words, in the transition from the state C of FIG. 9C to the state D of FIG. 9D described above, the guide plate L30 is rotationally moved downward and forward with respect to the printer 1. On the other hand, from the state C of FIG. 11B to the state D of FIG. 11C, the guide plate 30L is fixed. Therefore, the roller portion 7*a* of the roller 7 is separated from the print medium P, and the printer 1 moves upward and backward as indicated by the arrow A2. Thus, the line break operation is performed. The printer 1 referred to here means the printer 1 body portion including the box-shaped structure that is the print head holding portion 12, and also means the printer 1 body portion excluding the guide plate 30L.

Figure 10C:
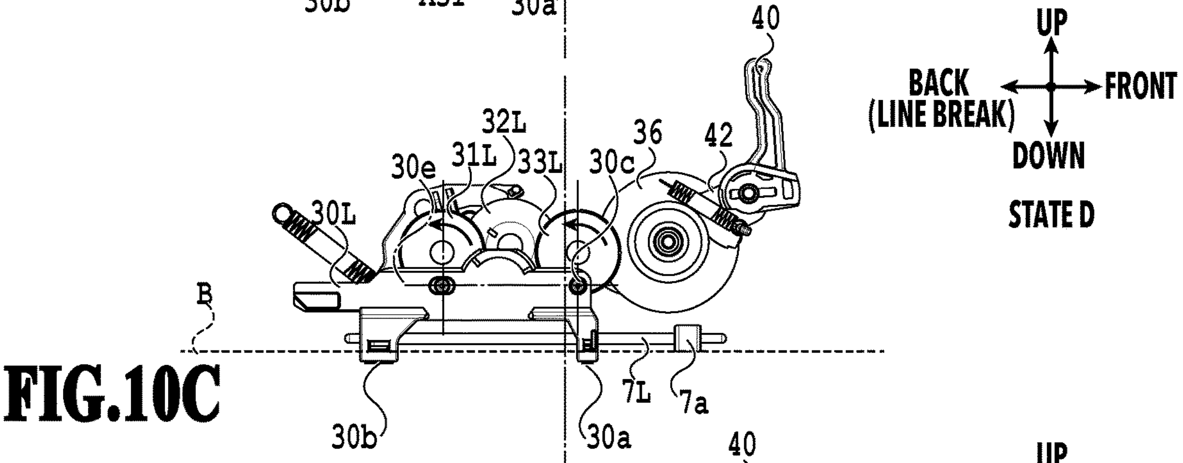
Figure 10D:
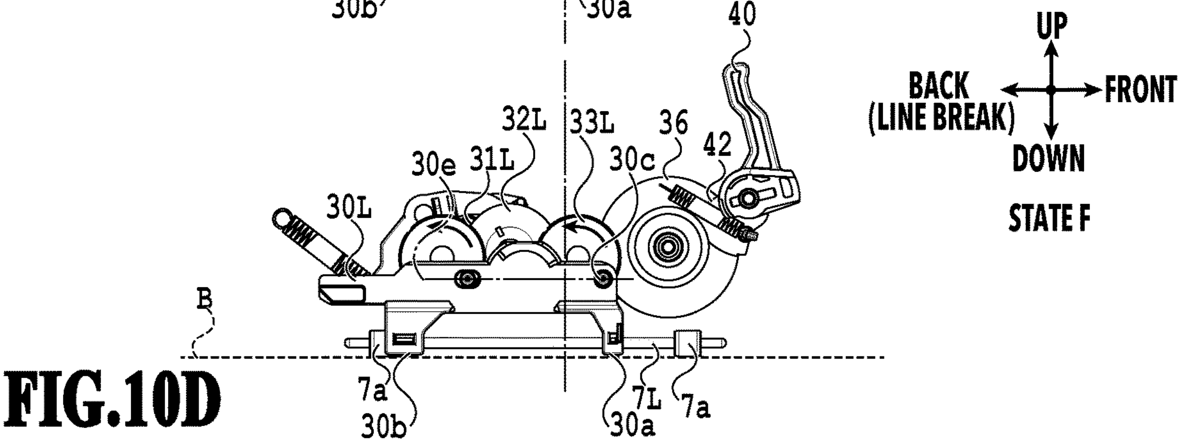
Figure 11C:
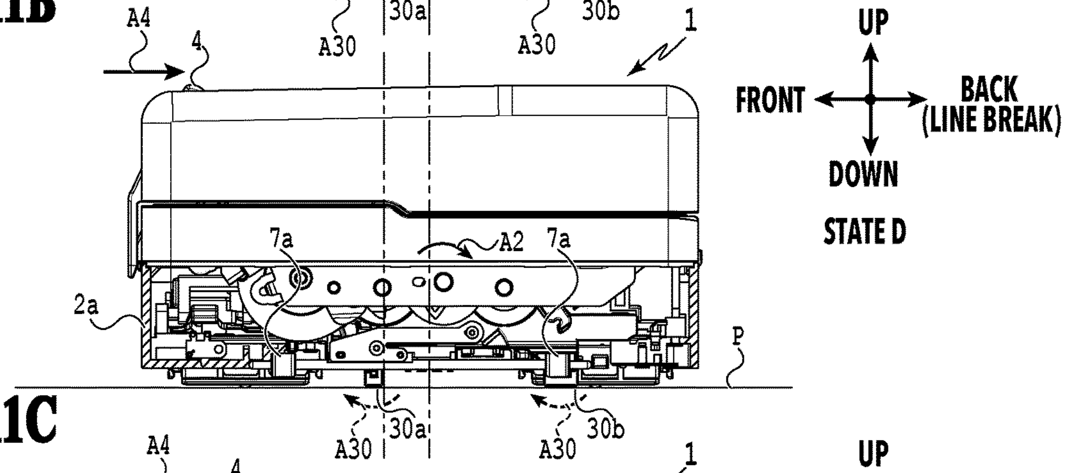
Figure 11D:
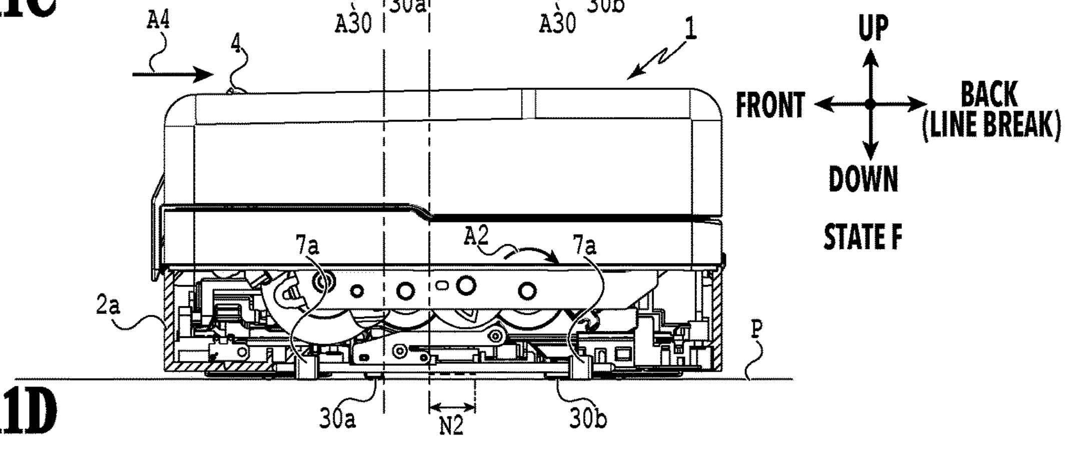

FIG. 11C illustrates the state D of FIGS. 9D and 10C. The state D is a position where the first and second bosses 33*a* and 31*a* have reached the lowest position on the respective gears as described above. That is, in the state D of FIG. 11C, the printer 1 is located in the highest position. Thereafter, as the drive proceeds, the printer 1 moves backward and downward along with the rotation of the first and second guide plate drive gears 33L and 31L, and reaches the state F of FIG. 11D. The state F of FIG. 11D is the state F of FIGS. 9F and 10D. In the state F, the first and second contact portions 30*a* and 30*b* of the guide plate 30L have reached the plane B again. That is, in the state F of FIG. 11D, the roller portion 7*a* of the roller 7 comes into contact with the print medium P again. Thereafter, since the guide plate 30L moves in the direction of the arrow A30, the first and second contact portions 30*a* and 30*b* are separated from the print medium P.

Therefore, the line break operation in a narrow sense starts from a point where the first and second contact portions 30*a* and 30*b* of the guide plate 30L in the state C illustrated in FIG. 11B come into contact with the print medium. Then, the line break operation in a narrow sense is completed as the roller portion 7*a* of the roller 7 once separated from the print medium P comes into contact with the print medium P again as in the state F of FIG. 11D. More specifically, the line break operation is performed by the box-shaped structure moving in the second direction relative to the guide plate 30L. After the state F, the reset mechanism described above operates to shift to the state H illustrated in FIG. 9H, and the line break operation as a whole is completed.

As described above, since the printer 1 body is quantitatively moved by the first and second guide plate drive gears 33L and 31L and the guide plate 30L, it is possible to perform the line break operation with high accuracy.

Further, the first and second contact portions 30*a* and 30*b* of the guide plate 30L are located at a first position where a printing operation for printing is possible during a printing scan. The first position is a position that does not come into contact with the print medium P. As the drive by the drive train proceeds, the positions of the first and second contact portions 30*a* and 30*b* change (are displaced), and in the process of this displacement, the printer 1 body is moved in the line break direction. Then, at the end of driving by the drive train, the first and second contact portions return to the first position. In other words, before the line break operation, the guide plate 30L is in a first state separated from the printing surface of the print medium P. From that state, the first and second contact portions 30*a* and 30*b* are driven so as to shift to the first separated state again through a second state where the first and second contact portions 30*a* and 30*b* are in contact with the printing surface of the print medium P. Then, while the first and second guide plate drive gears 33L and 31L are driven in the second state where the first and second contact portions 30*a* and 30*b* are in contact with the printing surface of the print medium P, the guide plate 30L moves the printer 1 body in the line break direction. In the present embodiment, a description has been given of an example of using a total of four contact portions. However, it suffices that a plurality of contact portions are provided and can serve as fixed base points during contact. For example, the number of contact portions may be less than or more than four.

Since the printer 1 moves in the line break direction in response to the operation of the line break lever 4 by the operator, the operator can intuitively grasp the line break direction and easily guide the printer 1 in the line break direction. In the present embodiment, a description has been given of an example where the direction in which the operator operates the line break lever 4 coincides with the line break direction, but the present disclosure is not limited thereto. The direction of the operation force in the case where the operator operates the line break lever 4 may form an acute angle with the line break direction (second direction). In this case, again, the operator can intuitively grasp the line break direction. For example, even if the configuration is such that the line break lever 4 is pushed downward from above the device, the printer 1 automatically moves in the line break direction. Thus, the operator can intuitively grasp the line break direction and easily guide the printer 1 in the line break direction.

Further, the above description has been given that the position of the state E of FIG. 9E is the operation completion position of the drive lever 40 (line break lever 4). However, in the state D of FIG. 9D (FIGS. 10C and 11C), for example, if the printer 1 can be driven to the position where the first and second bosses 33*a* and 31*a* have reached their lowest positions, then the printer 1 subsequently moves backward and downward. Therefore, the operator simply applies the weight of his/her hand holding the printer 1 in the direction in which the printer 1 body is moved by the operation of the line break lever 4, and thus the guide plate drive gears 33 and 31 naturally rotate. As a result, the rest of the line break operation can be performed. That is, the line break operation can be performed even if the operator does not necessarily pull the line break lever 4 all the way down (even if the drive lever 40 returns to the initial position before abutting against the abutting portion not illustrated).

<Brake Mechanism>

As described above, if the first and second guide plate drive gears 33L and 31L rotate naturally, there is a possibility that the printer 1 suddenly moves downward from the highest position. As a result, it is conceivable that the roller portion 7*a* of the roller 7 vigorously comes into contact with the print medium P, resulting in vibration or noise emission. Therefore, in the present embodiment, a brake mechanism for decelerating the drive is provided as described with reference to FIGS. 6, 7, and 9A to 9H. The brake mechanism is a mechanism for decelerating the drive of the first guide plate drive gears 33L and 31L in a case where the roller portion 7*a* comes into contact with the printing surface again from the state of being separated from the printing surface of the print medium P.

As illustrated in FIGS. 6 and 7, the brake mechanism includes brake levers 26L and 26R, brake cams 27L and 27R, and a brake lever spring 25. The brake lever 26L is supported on a shaft fixed to the holding sheet metal 34L so as to be rotatable about a rotation center 26*a*. The brake cam 27L is integrally fixed to the first guide plate drive gear 33L and rotates together with the first guide plate drive gear 33L. The brake lever spring 25 is stretched between the brake lever 26L and the holding sheet metal 34L to bias a tip portion 26*b* of the brake lever 26L toward the brake cam 27L. As in the example described above, a description will be given based on the left drive train, and description of the right drive train will be omitted.

In such a brake mechanism, the brake lever 26L and the brake cam 27L are separated from each other in a state of FIGS. 9A to 9D. On the other hand, during the transition from FIG. 9D to FIG. 9E, the tip portion 26*b* of the brake lever 26L slides against the cam surface 27*a* of the brake cam 27L. As a result, the brake lever 26L hinders the rotation of the brake cam 27L. As the rotation of the brake cam 27L is hindered, the rotation of the first guide plate drive gear 33L is hindered. This makes it possible to prevent the printer 1 from suddenly moving downward from the highest position. Further, during the transition from the state of FIG. 9E to the state of FIG. 9F, the cam surface 27*a* of the brake cam 27L is configured to be separated from the brake lever 26L so as not to hinder the drive by the reset mechanism. Thus, the brake mechanism has been described above. In the present embodiment, a description has been given of an example where the brake mechanism is arranged in both the left and right drive trains, but the brake mechanism may be arranged in either one of the drive trains.

<Contact Portion>

In order to accurately perform line break operation with the printer 1 body, it is important that the positions of the first and second contact portions 30*a* and 30*b* of the guide plate 30 and that of the print medium P do not deviate as much as possible while the first and second contact portions 30*a* and 30*b* are in contact with the print medium P. Therefore, it is preferable that the first and second contact portions 30*a* and 30*b* are configured to have high frictional resistance with the print medium P. As the configuration in which the frictional resistance between the first and second contact portions 30*a* and 30*b* and the print medium P is high, a configuration is conceivable in which a component having a high friction coefficient such as rubber is integrally attached, for example. Alternatively, it is also conceivable to apply coating treatment such as urethane coating having a high friction coefficient or coating containing abrasive grains to the first and second contact portions 30*a* and 30*b*. It is also conceivable that the tip portions of the first and second contact portions 30*a* and 30*b* each have a convex shape that bites into the print medium P. The configuration is not limited to these examples, and other configurations may be used as long as a high frictional resistance with the print medium P is achieved.

<Guide Plate Position Restricting Mechanism>

Next, a position restricting mechanism of the guide plate will be described. During the line break operation of the present embodiment, the roller portion 7*a* of the roller 7 is separated from the print medium P while the first and second contact portions 30*a* and 30*b* of the guide plate 30 are in contact with the print medium P, resulting in a state where the printer 1 is floating. In such a state, if there is a gap between the guide plate 30 and the printer 1 body, the printer 1 body may be tilted with respect to the guide plate 30 by the gap. If the printer 1 is tilted in its floating state, the angle of the roller 7 in a case where the roller portion 7*a* of the roller 7 comes into contact with the print medium P again may no longer be perpendicular to the printing direction of the previous printing. In this case, it is conceivable that during printing of the next line, a gap may be created with the previous line, or the line may overlap with the previous line, resulting in poor printing quality.

Therefore, in the present embodiment, a position restricting mechanism for the guide plate 30 is provided so as to prevent creation of a gap between the guide plate 30 and the printer 1 in a case where the printer 1 is floating from the print medium P. The position restricting mechanism is configured to press the guide plate 30 against a position defining portion (sliding contact surface) of the guide plate 30 provided in the printing direction in the print head holding portion 12 or the lower case 2*a* and the like. The guide plate 30 is pressed against the position defining portion (sliding contact surface) of the guide plate 30 from the start of the line break operation by the operator until the first and second contact portions 30*a* and 30*b* of the guide plate 30 come into contact with the print medium P.

Figure 14A:
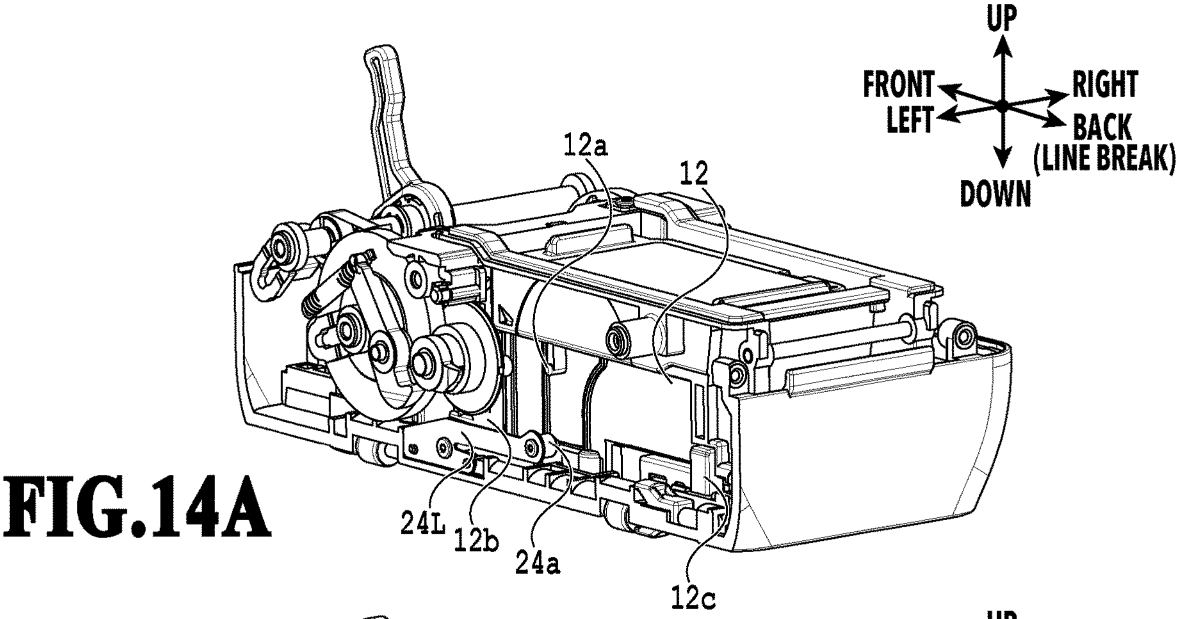
FIGS. 14A to 14C are views illustrating a position restricting mechanism of a guide plate, according to one more embodiment of the subject innovation.
Figure 14B:
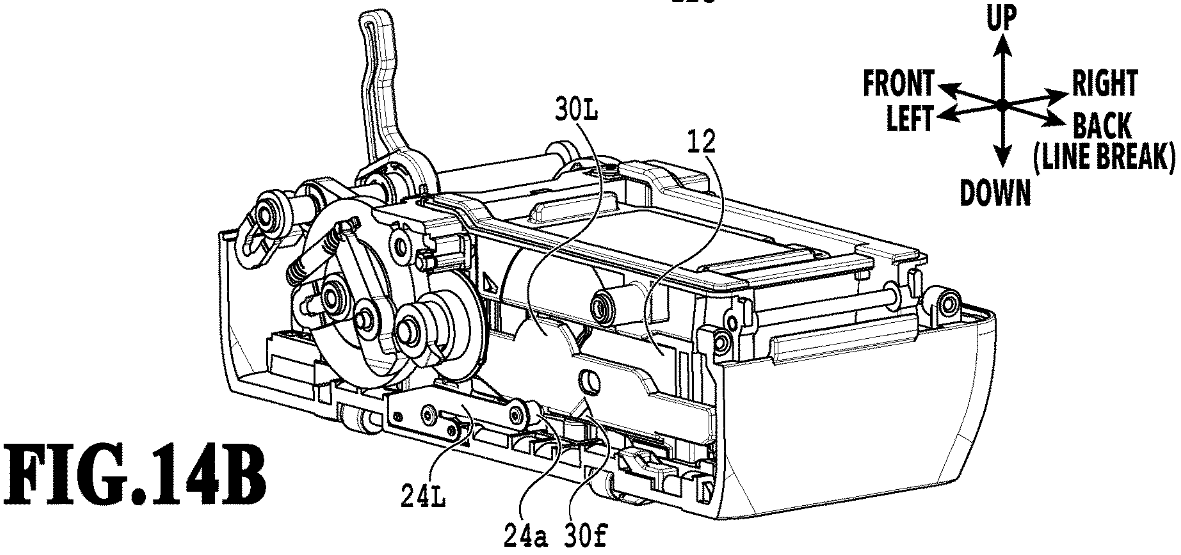
Figure 14C:
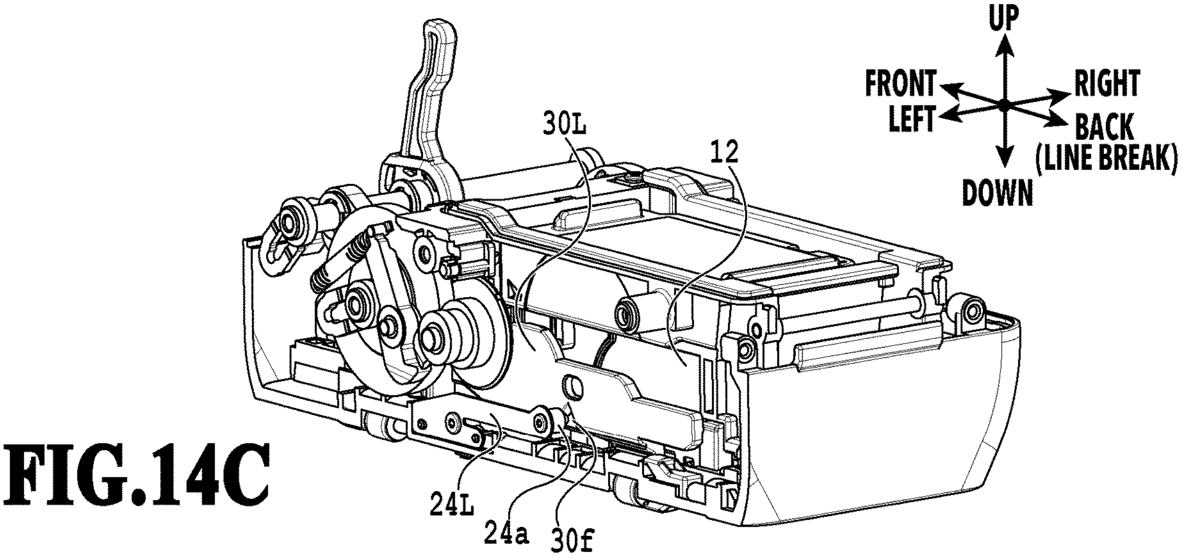

FIGS. 14A to 14C are views illustrating the position restricting mechanism of the guide plate. FIGS. 14A to 14C are internal perspective views of the printer 1, illustrating a state where, for convenience of explanation, the lower housing portion 2 is partially cut so that the internal mechanism can be seen. In FIG. 14A, abutting surfaces 12*a*, 12*b*, and 12*c* are abutting surfaces of the guide plate 30L provided to the print head holding portion 12. The printer 1 includes a biasing spring 24L which is a leaf spring that biases the guide plate 30L toward the abutting surfaces 12*a* to 12*c*. The printer 1 further includes a sliding member 24*a* that is integrally fixed to the biasing spring 24L and comes into contact with the guide plate 30L to transmit a biasing force of the biasing spring 24L to the guide plate 30. Note that FIG. 14A illustrates a state where the guide plate 30L is removed. As in the above example, description of the right drive train will be omitted.

FIGS. 14B and 14C illustrate a view including the guide plate 30L. A slope for the sliding member 24*a* to enter is formed below the guide plate 30L. In FIG. 14B, as the line break operation is started by the operator, the sliding member 24*a* comes into contact with the guide plate 30 before the first and second contact portions 30*a* and 30*b* of the guide plate 30L come into contact with the print medium P. Then, the guide plate 30L is pressed against the abutting surfaces 12*a* to 12*c* by the biasing force of the biasing spring 24L. As the line break operation by the operator proceeds in this state, the first and second contact portions 30*a* and 30*b* of the guide plate 30L come into contact with the print medium P in a state where the guide plate 30L is in contact with the abutting surfaces 12*a* to 12*c*. As described above, the line break operation is performed with the first and second contact portions 30*a* and 30*b* as the fixed base points on the print medium P, that is, in an immobile state. Therefore, the print head holding portion 12 (box-shaped structure) is sandwiched without any gaps between the guide plates 30L and 30R. Since the printer 1 is lifted in this state, the tilt of the printer 1 can be suppressed as much as possible.

FIG. 14C is a view illustrating a state before the line break operation in a narrow sense is completed, that is, a state before the state F illustrated in FIGS. 9F and 11D. As illustrated in FIG. 14C, the sliding member 24*a* of the biasing spring 24L falls into a recess 30*f* provided in the guide plate 30L before the line break operation is completed. Thus, the guide plate 30L and the sliding member 24*a* are separated. As a result, the drive by the reset mechanism is not hindered after the line break operation is completed. Thereafter, the guide plate 30L rotates upward as illustrated in FIG. 9G, but since the roller portion 7*a* of the roller 7 is already in contact with the print medium P, the posture of the printer 1 does not deviate. In this state, no restriction by the guide plate position restricting mechanism is performed. Thus, the guide plate position restricting mechanism has been described above.

In the line break operation described above, it is possible that the operator accidentally releases his/her finger while pulling the line break lever 4 up to some point. In this case, the line break operation stops in the middle. However, as described above, if the first and second bosses 33*a* and 31*a* can be driven to the position where the lowest positions are reached, the first and second guide plate drive gears 33 and 31 are naturally rotated as described above, and the rest of the line break operation can be completed. That is, even if the first and second contact portions 30*a* and 30*b* come into contact with the print medium P and the printer 1 is stopped in a floating state, the rest of line break operation can be completed as long as the printer can be driven up to the position where the first and second bosses 33*a* and 31*a* have reached their lowest positions. That is, the line break operation can be completed if the printer is past the state D.

However, there is also a possibility that the operator releases the line break lever 4 before the first and second bosses 33*a* and 31*a* of the first and second guide plate drive gears 33L and 31L reach the lowest positions. In this case, the first and second guide plate drive gears 33L and 31L cannot rotate in directions opposite to the directions of the arrows A33 and A31, which are the line break directions, due to the action of the one-way clutch 38, and thus are stopped in their positions. However, since the first and second contact portions 30*a* and 30*b* are in contact with the print medium P as in the state C of FIG. 9C, the position of the printer 1 does not change unless the printer is forcibly moved. Therefore, by pulling the line break lever 4 again from that state, the guide plate 30L can be driven again, and the line break operation can be completed. However, in this case, if the angle of the guide plate drive gear 33 rotated by one operation of the line break lever 4 is too large, the guide plate drive gear 33 goes beyond the initial position, leading to a possibility that the operating phase of the guide plate drive gear 33 deviates. In this regard, an angle obtained by subtracting an angle (for example, 90°) up to a point where the first boss 33*a* reaches the lowest position from the start of driving the guide plate drive gear 33 from one rotation angle (360°) of the guide plate drive gear 33 (360−90=270°) is set as a predetermined angle. Then, there is no problem as long as the guide plate drive gear 33 is not rotated by this predetermined angle or more in one operation of the line break lever 4.

Although a description has been given of an example where the one-way clutch is provided in the gear 39 of the drive train, the one-way clutch may be provided in the first and second guide plate drive gears 33L and 31L. That is, a reverse drive restricting unit for restricting reverse drive in the second direction, which is the line break direction, may be provided either in the drive train or in a second guide unit.

As described above, according to the present embodiment, accurate line break operation can be performed. Further, in the present embodiment, the printer 1 starts the line break operation (movement in the second direction) as the operator performs one operation of pulling down the line break lever 4. Therefore, the operator can intuitively recognize the line break direction and can smoothly move the printer body in the line break direction. Since the second guide unit, which is the line break mechanism, moves the printer 1 body by a predetermined amount, accurate line break operation is possible. Further, in the present embodiment, a configuration is not employed in which the printer body is tilted with the corner of the body as a fulcrum, for example, to press the guide member against the printing surface, and then the corner of the handheld printer body is moved in the line break direction with a contact portion of the pressed guide member as a fulcrum. Therefore, it is possible to provide a handheld printer capable of reducing damage to or contamination of the printing surface without the printer sliding against the printing surface.

Second Embodiment

In the printer 1 of the first embodiment, a description has been given of an example where the operator operates the line break lever 4 and the drive lever 40 is operated to perform a line break operation. In the present embodiment, an example where a line break operation is performed using a motor instead of the line break lever 4 and the drive lever 40 will be described.

Figure 15:
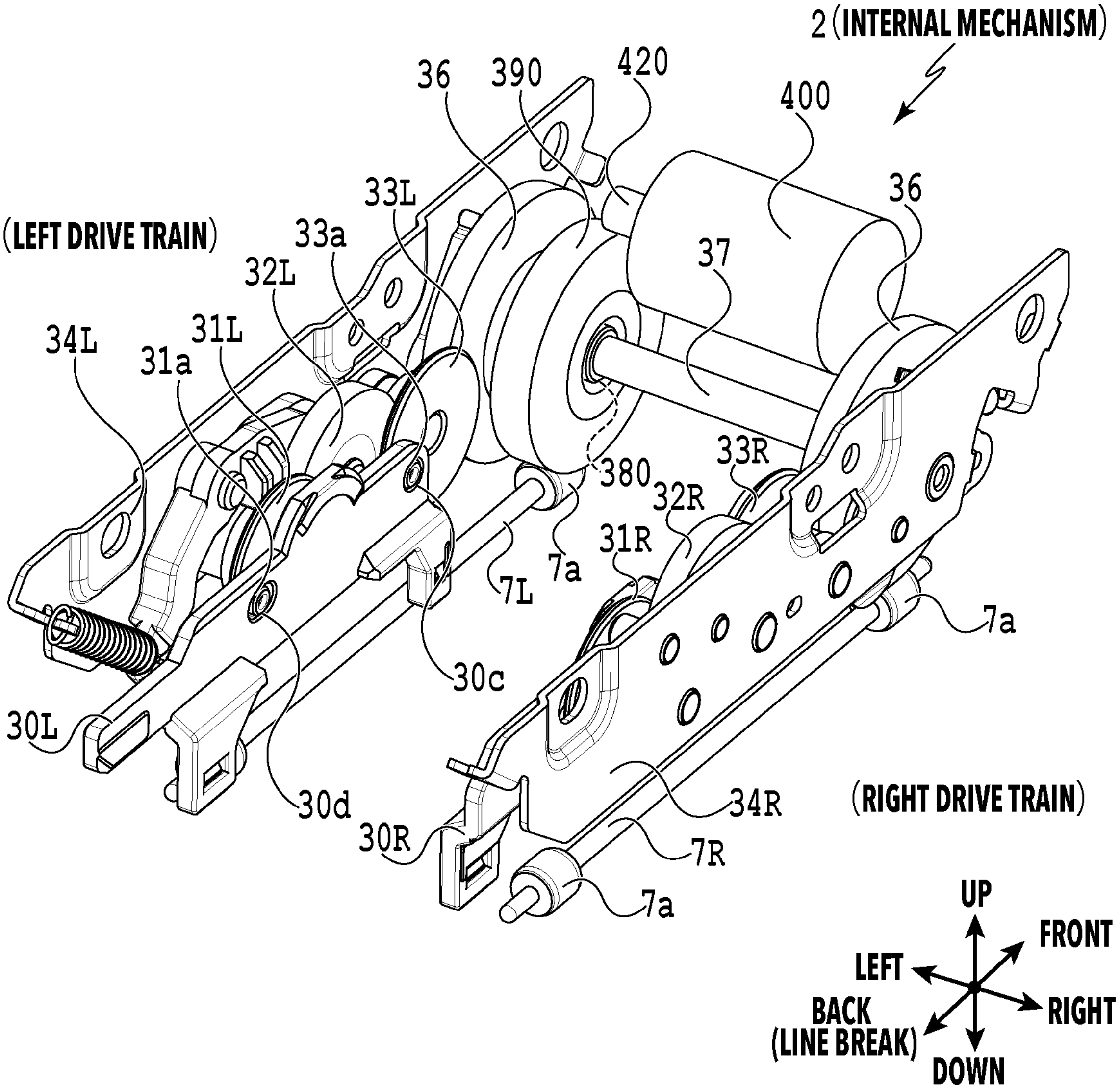
FIG. 15 is an internal perspective view for explaining the line break operation of the printer, according to one more embodiment of the subject innovation.

FIG. 15 is an internal perspective view for explaining a line break operation of a printer 1. The same configurations as those of the printer 1 of the first embodiment are denoted by the same reference numerals. In FIG. 15, a line break mechanism 20 includes a motor 400 as an actuator. In the present embodiment, a line break operation is performed using the motor 400. The motor 400 is connected to a control board by an electric wire component not illustrated, a motor gear 420 is connected to a gear 390, and the gear 390 is integrally fixed to a shaft 37. Since other configurations are the same as those of the first embodiment, description thereof will be omitted.

In such a configuration, the operator drives the motor 400 through a control unit by pressing a line break button not illustrated, which is provided in an upper case 3*a* of an upper housing portion 3 and electrically connected to the control board. Then, the motor 400 drives a drive train in a line break direction. As long as guide plate drive gears 33 and 31 are configured to rotate once each time the line break button is pressed, there is no need to provide the one-way clutch 38, the reset mechanism, and the brake mechanism described in the first embodiment.

By providing the line break button so as to be pressed in the direction corresponding to the line break direction as in the case of the line break lever 4 of the first embodiment, the operator can intuitively grasp the line break direction even in the case of motor drive. Therefore, since the printer 1 can be guided in the line break direction so as not to hinder the movement of the motor 400, more stable line break operation can be performed.

Further, as in the case of the configuration described in the first embodiment, for example, the operator may operate the lever. In this event, next to the gear 39 illustrated in FIG. 8, the gear 390 illustrated in FIGS. 13A to 13D is pivotally supported by the shaft 37 via the one-way clutch 380 so as to be connected to the motor 400. Thus, a configuration may be adopted, in which the motor 400 assists the operation of the operator operating the lever.

In the present embodiment, the actuator is a motor, but the actuator is not limited to the motor, and a solenoid or the like may be used as long as a driving force can be generated to drive the drive train. As described above, accurate line break operation can be performed in the present embodiment.

Third Embodiment

In the first and second embodiments, a description has been given of an example where the guide roller 7L is pivotally supported by the lower case 2*a* of the lower housing portion 2. In the present embodiment, an example will be described where a guide roller 7L that is a first guide unit is held by a guide plate 30 that is a second guide unit. In the present embodiment, again, as in the embodiments described above, description will be given based on the left drive train, and description of the right drive train will be omitted.

FIGS. 16A to 16D are left side views of a line break mechanism for explaining a driving operation of the line break mechanism of the present embodiment. In FIGS. 16A to 16D, a guide plate 300L has the same configuration as that of the guide plate 30L described in the first embodiment. That is, a rotation shaft hole (not illustrated) of the guide plate 300L is rotatably supported on a first boss 33*a* of a first guide plate drive gear 33L. Further, an oblong hole (not illustrated) of the guide plate 300L is rotatably engaged with a second boss 31*a* of a second guide plate drive gear 31L. It is also assumed that the center line between the rotation shaft hole and the oblong hole of the guide plate 300L is provided in a linear position.

A guide roller 7L is rotatably supported on the lower end of the guide plate 300L. The guide roller 7L has its shaft center line set substantially parallel to the center line of the rotation shaft hole and the oblong hole of the guide plate 300L. Therefore, as in the example described in the first embodiment, the guide plate 300L rotates while maintaining a substantially horizontal position as the first and second guide plate drive gears 33L and 31L rotate. Likewise, the guide roller 7L also rotates while maintaining a substantially horizontal position. In the present embodiment, contact portions (line break legs) corresponding to the first and second contact portions 30*a* and 30*b* described in the first embodiment are provided on the lower surface of the lower case 2*a* of the lower housing portion 2, separately from the guide plate 300L. A line break operation in the present embodiment in the above configuration will be described.

In the first embodiment, a description has been given of an example where the first and second contact portions 30*a* and 30*b* of the guide plate 30L that is the second guide unit take the position retracted from the print medium P as the initial position during a printing operation of the printer 1. In the present embodiment, the roller portion 7*a* of the guide roller 7L needs to come into contact with the print medium P during a printing operation of the printer 1. Therefore, the initial position of the guide plate 300L is a state where the roller portion 7*a* of the guide roller 7L is in contact with the print medium P.

In the example of FIGS. 16A to 16D, for easy understanding, a description will be given assuming that a state where the first and second bosses 33*a* and 31*a* of the first and second guide plate drive gears 33L and 31L are in the lowest position with respect to the respective gears is considered as the initial position. In the first embodiment, a description has been given of an example where if the first and second bosses 33*a* and 31*a* are in the lowest position, the guide plate drive gears 33 and 31 are allowed to rotate naturally. In the present embodiment, it is assumed that the motor-driven method described in the second embodiment is adopted, and the first and second guide plate drive gears 33L and 31L do not rotate naturally due to a load of the motor. Of course, another lock mechanism may be provided to lock the first and second guide plate drive gears 33L and 31L so as not to rotate except during a line break operation.

Figure 16A:
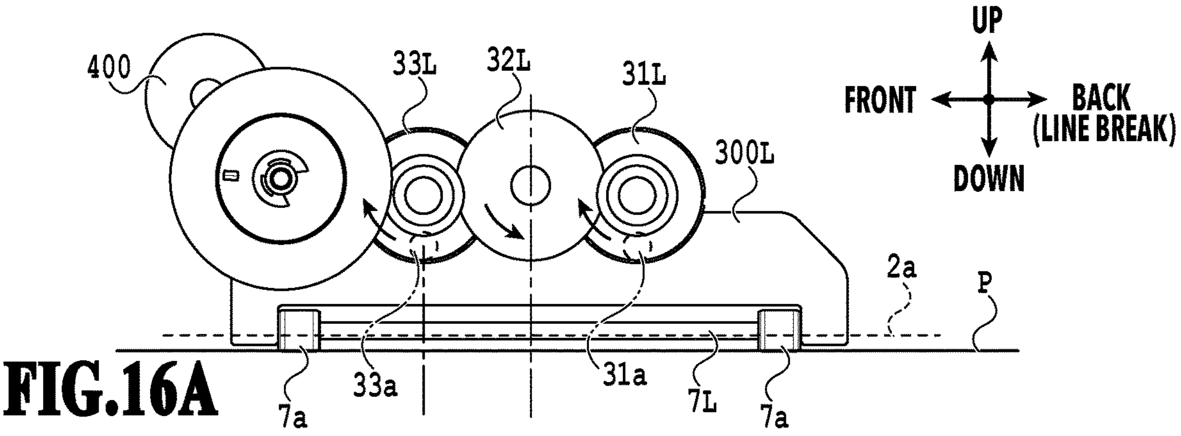
FIGS. 16A to 16D are left side views of the line break mechanism for explaining the driving operation of the line break mechanism, according to one more embodiment of the subject innovation.

FIG. 16A illustrates a state of the printer 1 during a printing operation, in which the first guide plate drive gears 33L and 31L and the guide plate 300L are in the initial positions. The roller portion 7*a* of the guide roller 7L protrudes from the lower surface of the lower case 2*a* of the lower housing portion 2 indicated by the broken line, and is in contact with the print medium P. Therefore, in FIG. 16A, printing can be performed through manual scanning by the operator.

Figure 16B:
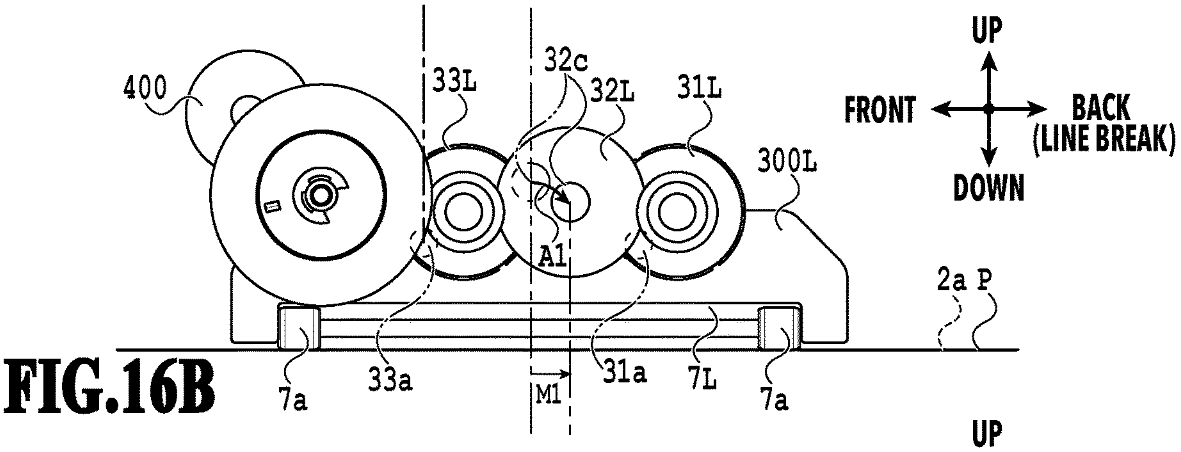

As the line break button (not illustrated) is pressed to start the line break operation, the first guide plate drive gears 33L and 31L are rotated by the motor 400. Here, the guide plate 300L is in a state where the roller portion 7*a* of the guide roller 7L is in contact therewith. Therefore, even if the first guide plate drive gears 33L and 31L are rotated, the guide plate 300L cannot be rotated. Therefore, as illustrated in FIG. 16B, the printer 1 body moves in accordance with the movement of the first and second bosses 33*a* and 31*a* of the first guide plate drive gears 33L and 31L. That is, as indicated by the arrow A1, the rotation center of the idler gear 32L is moved from the initial position 32*c* indicated by the broken line to the position 32*c* indicated by the solid line on the back and lower side. As the printer 1 reaches the position illustrated in FIG. 16B, the contact portion not illustrated on the lower surface of the lower case 2*a* of the lower housing portion 2 comes into contact with the print medium P, and the movement of the printer 1 body is temporarily stopped. A moving amount of the printer 1 in the line break direction in this event is M1.

Thereafter, as the line break operation proceeds, the contact portion (not illustrated) on the lower surface of the lower case 2*a* of the lower housing portion 2 is in contact with the print medium P, and thus the roller portion 7*a* of the guide roller 7L is temporarily separated from the print medium P by the rotation of the first guide plate drive gears 33L and 31L. Then, as the roller portion 7*a* of the guide roller 7L rotates counterclockwise in FIG. 16B and reaches the state illustrated in FIG. 16C, the roller portion 7*a* of the guide roller 7L comes into contact with the print medium P again. Meanwhile, the printer 1 body is stopped. It is preferable that the contact portion (not illustrated) on the lower surface of the lower case 2*a* has a configuration with high frictional resistance with the print medium P so that the position of the printer 1 does not deviate between FIGS. 16B and 16C, as in the case of the first and second contact portions 30*a* and 30*b* of the guide plate 30 described above.

Figure 16C:
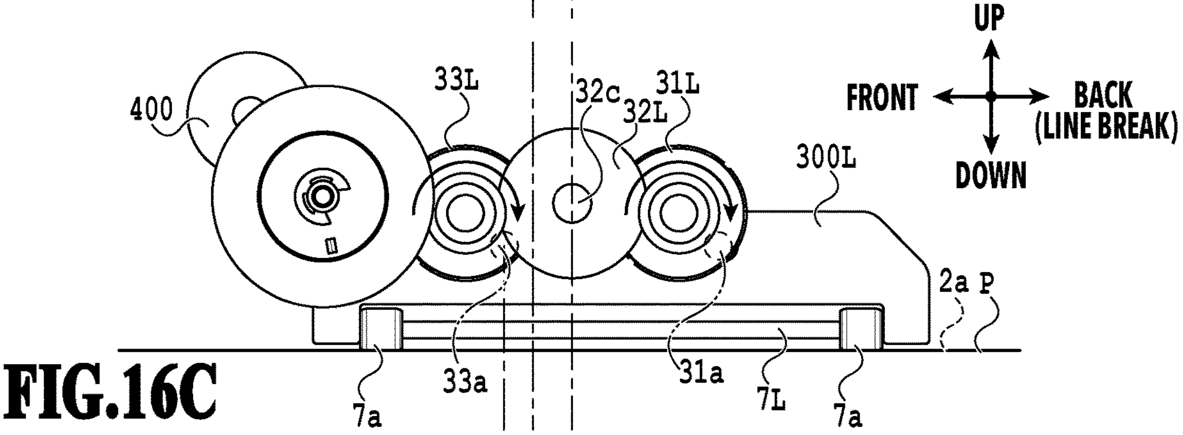
Figure 16D:
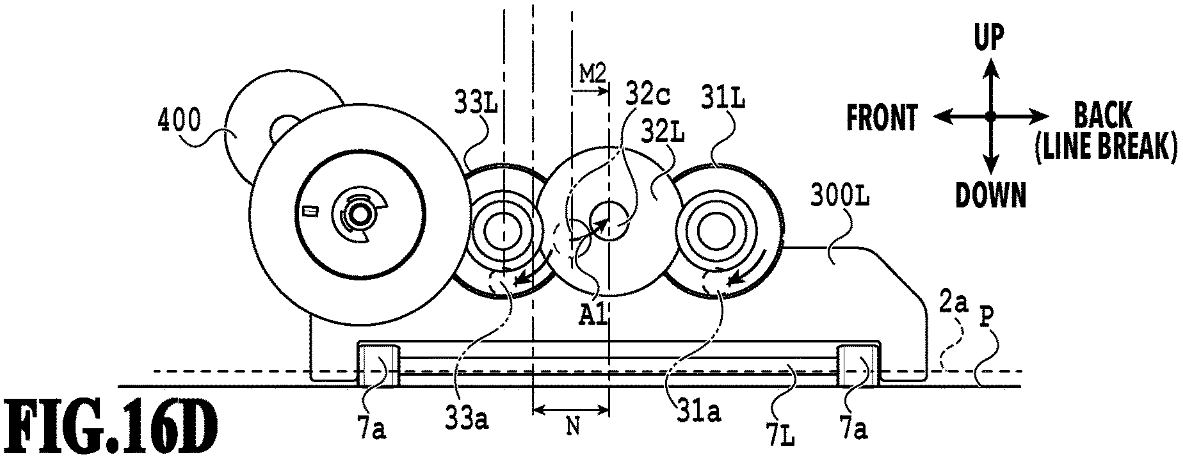

As the line break operation further proceeds from the state illustrated in FIG. 16C, the guide plate 300L tries to move downward and forward as the first guide plate drive gears 33L and 31L rotate. However, since the roller portion 7*a* of the guide roller 7L is in contact therewith, the printer 1 moves upward and backward as indicated by the arrow A1 as illustrated in FIG. 16D. Thus, the line break operation is completed. Assuming that the moving amount of the printer 1 from FIG. 16C to FIG. 16D in the line break direction is M2, a line break amount of the printer 1 is M1+M2. This M1+M2 corresponds to a printing width N (width of a nozzle array used for printing). Further, in the present embodiment, since the initial positions of the first and second bosses 33*a* and 31*a* are the lowest positions, M1=M2. Of course, the initial positions of the first and second bosses 33*a* and 31*a* may start from any position with respect to the guide plate drive gear. In that case, M1≠M2.

As described above, accurate line break operation can also be performed in a configuration in which the guide plate 300L as the second guide unit holds the guide roller 7L as the first guide unit.

In the present embodiment, from the start of the line break operation to the contact of the contact portion on the lower surface of the lower case 2*a*, and from the recontact of the roller portion 7a of the guide roller 7L to the completion of the line break operation, there is a state where the roller portion 7a of the guide roller 7L is in contact with the print medium P. In this state, the printer 1 body may move in the printing direction. In this case, if the positional relationship between the printer 1 body and the print medium P is measured by the tracking sensor described in the first embodiment, it is possible to take measures such as changing the printing start position of the next printing by correcting with the moving amount.

Fourth Embodiment

In the first and second embodiments, a description has been given of an example where, after the first and second contact portions 30a and 30b of the second guide unit come into contact with the print medium P, the first and second contact portions 30a and 30b do not move on the print medium P and serve as the fixed base points. Then, an example of moving the printer 1 in the line break direction with the first and second contact portions 30a and 30b as the fixed base points has been described. In the present embodiment, an example will be described in which a contact portion of the second guide unit with the print medium P is a contact portion such as a rolling contact, and a contact position with the print medium P changes with a line break operation of the printer 1. In the present embodiment, again, description will be given based on the left drive train, and description of the right drive train will be omitted, as in the embodiments described above.

Figure 17A:
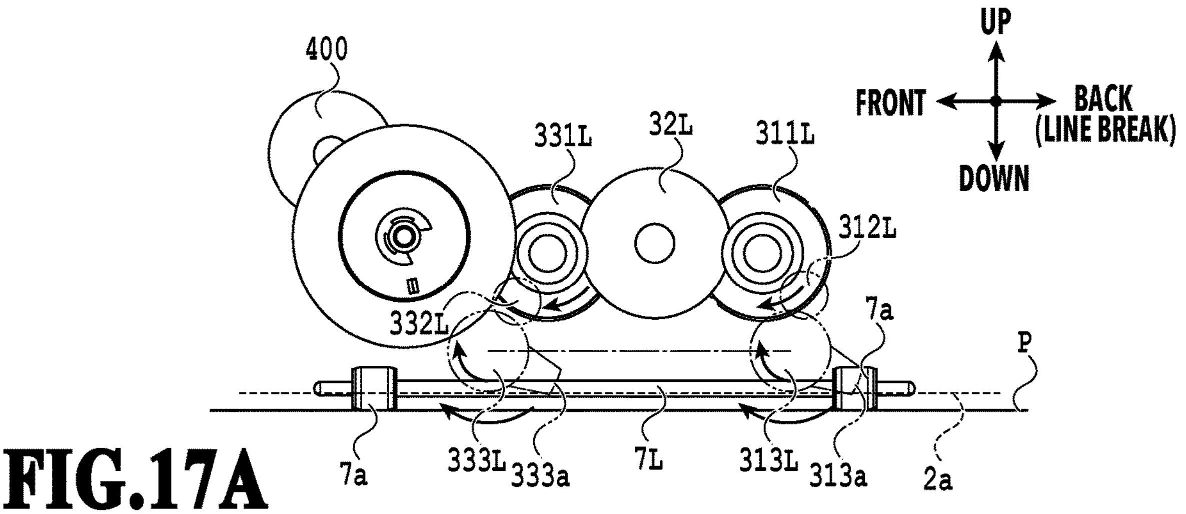
FIGS. 17A to 17C are left side views of the line break mechanism for explaining the driving operation of the line break mechanism, according to one more embodiment of the subject innovation.
Figure 17B:
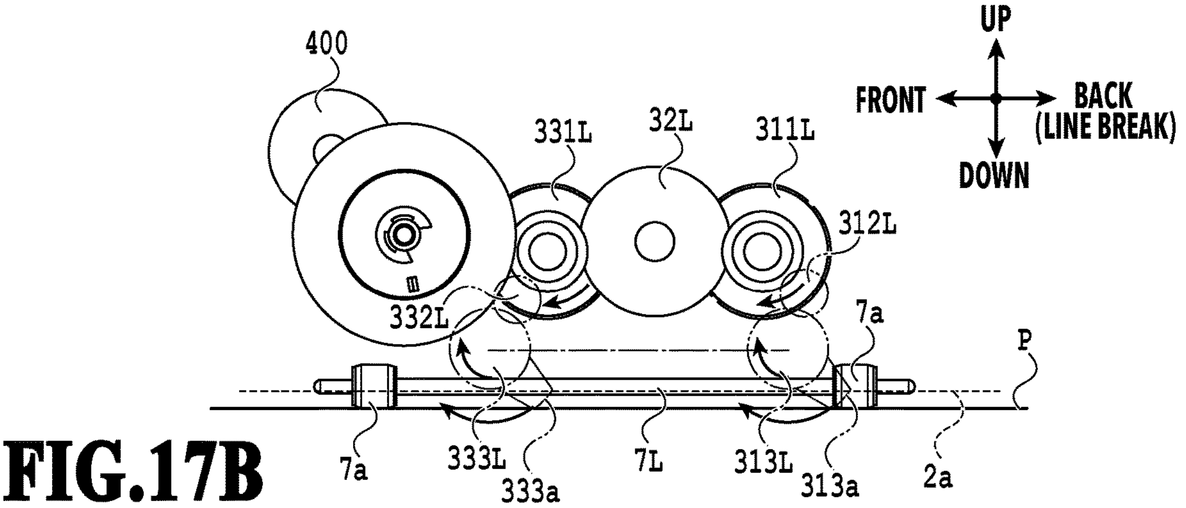
Figure 17C:
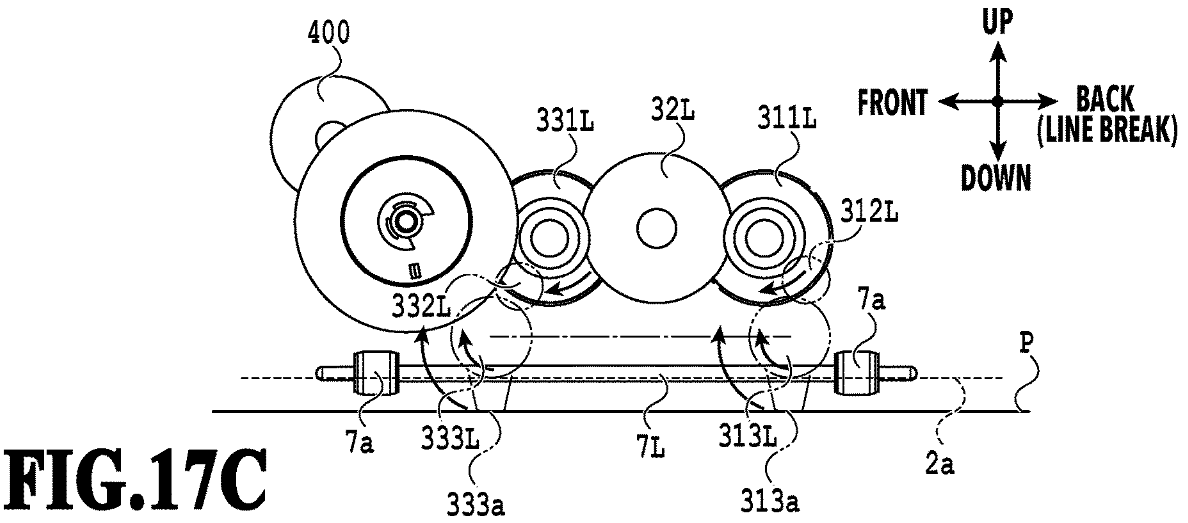

FIGS. 17A to 17C are left side views of the line break mechanism for explaining a driving operation of a line break mechanism of the present embodiment. A first line break guide 333L is gear-connected to a first drive gear 331L by a first idler gear 332L. A second line break guide 313L is gear-connected to a second drive gear 311L by a second idler gear 312L. Here, it is assumed that the first and second drive gears 331L and 311L have the same gear specifications as those of the first and second guide plate drive gears 33L and 31L described in the first embodiment. It is also assumed that the gear specifications of the first and second line break guides 333L and 313L are the same as those of the first and second drive gears 331L and 311L. Therefore, if the first and second drive gears 331L and 311L make one rotation, the first and second line break guides 333L and 313L also make one rotation in the same direction.

The first line break guide 333L is provided with a first contact portion 333a that comes into contact with the print medium P. The second line break guide 313L is provided with a second contact portion 313a that comes into contact with the print medium P. The first and second contact portions 333a and 313a are configured in an arc shape centered on the rotation center of the first and second line break guides 333L and 313L, respectively. Further, the first and second contact portions 333a and 313a are configured to have the same rotation phase. It is assumed that the guide roller 7L is rotatably supported by the lower case 2a of the lower housing portion 2 as in the first embodiment. In the present embodiment, description will be given of a case of the motor-driven system described in the second embodiment, but the drive system may use the drive lever as in the first embodiment.

FIG. 17A illustrates an initial state of the first and second line break guides 333L and 313L during a printing operation of the printer 1. In FIG. 17A, the first and second contact portions 333a and 313a are separated from the print medium P and are housed in the lower case 2a of the lower housing portion 2. Thus, printing can be performed through manual scanning by the operator.

As a line break button (not illustrated) is pressed to start a line break operation, the first and second drive gears 331L and 311L are rotated by the motor 400, and the first and second line break guides 333L and 313L are also rotated accordingly.

As the line break operation proceeds and reaches a state of FIG. 17B, the first contact portion 333a of the first line break guide 333L and the second contact portion 313a of the second line break guide 313L come into contact with the print medium P.

As the line break operation further proceeds, the printer 1 is lifted by the first and second contact portions 333a and 313a along with the rotation of the first and second line break guides 333L and 313L, and the roller portion 7a of the guide roller 7L is separated from the print medium P. Then, as illustrated in FIG. 17C, the printer 1 is sent in the line break direction by the first and second contact portions 333a and 313a.

Thereafter, as the rotation of the first and second contact portions 333a and 313a proceeds, the roller portion 7a of the guide roller 7L comes into contact with the print medium P again, and the line break operation of the printer 1 is completed. By driving the first and second drive gears 331L and 311L until the gears make one rotation, the first and second line break guides 333L and 313L also make one rotation. Then, as the initial state is reached, the driving is stopped and the line break drive is completed.

For the line break operation by the first and second contact portions 333a and 313a, not only the arc surface of the first and second contact portions 333a and 313a but also the corner portion of the contact portion as illustrated in FIG. 17B is used. At the end of the line break operation as well, the opposite corner is in contact with the print medium P, which contributes to the line break operation. While the arc-shaped surfaces of the first and second contact portions 333a and 313a are in contact with the print medium P, the arc-shaped surfaces of the first and second contact portions 333a and 313a are in rolling contact with the print medium P. The contact portion of the first and second contact portions 333a and 313a with the print medium P is moving in synchronization with the line break operation.

As has been described above, in the line break operation of the present embodiment, even in a configuration in which the contact portion with the print medium P involved in the line break operation of the printer 1 has its contact position with the print medium P change with the line break operation of the printer 1, it is possible to provide a printer capable of line break operation of the printer 1.

Fifth Embodiment

In the embodiments described above, a description has been given of an example where the housing holding the line break mechanism is the lower case 2a constituting the lower housing portion 2 of the printer 1 body. That is, an example where the line break mechanism is provided integrally with the printer 1 body has been described. In the present embodiment, an example will be described in which a line break mechanism is provided in a housing separate from the printer 1 body, and the separate housing provided with the line break mechanism is detachably attached to the printer 1 body. With such a configuration, it is still possible to obtain the same effect as in each of the above-described embodiments.

Figure 18A:
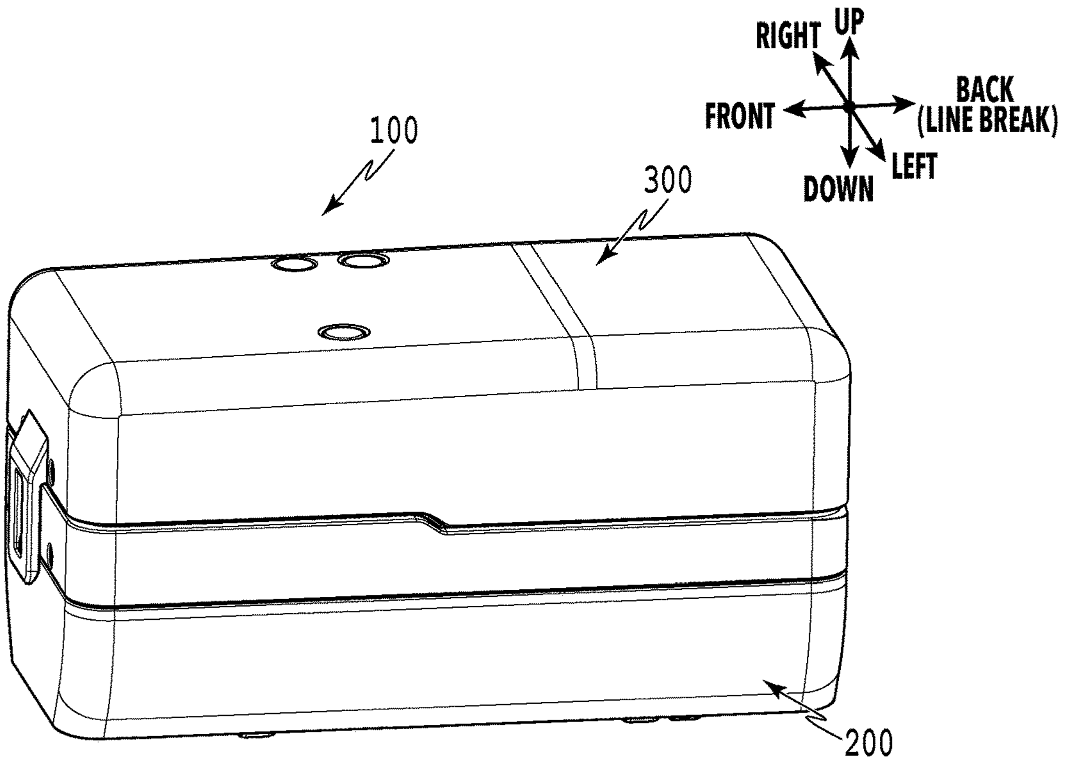
FIGS. 18A and 18B are views illustrating a configuration of the printer, according to one more embodiment of the subject innovation.
Figure 18B:
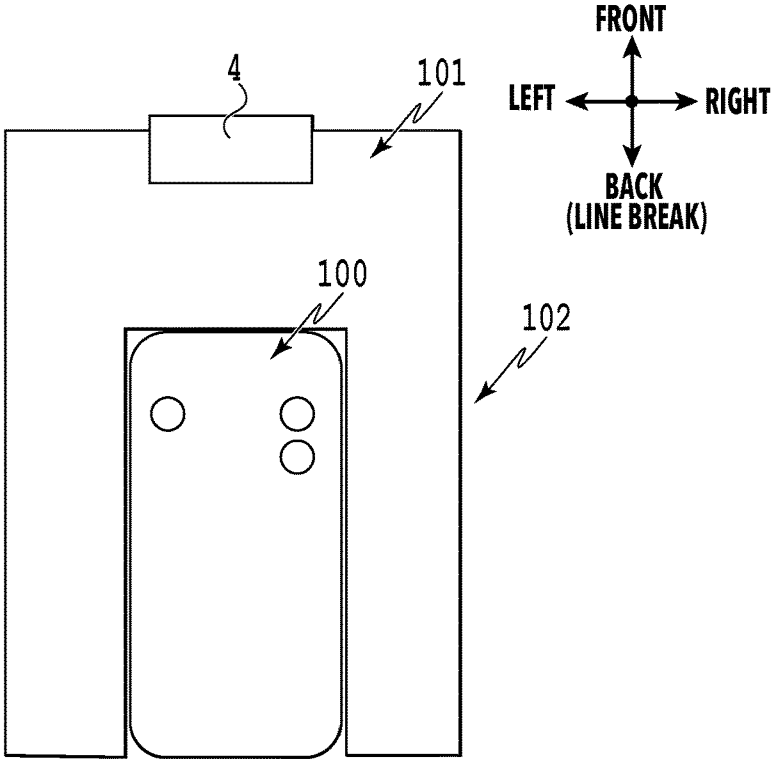

FIGS. 18A and 18B are views illustrating a configuration of a printer of the present embodiment. FIG. 18A is an overall perspective view illustrating a configuration of a printer body 100 of the present embodiment. FIG. 18B is a schematic view illustrating a state of a printer apparatus 102 in which a separate housing including a line break device 101 is attached to the printer body 100.

In FIG. 18A, the printer body 100 is a printer apparatus including components other than the line break mechanism among the printers 1 described in the first embodiment. A housing of the printer body 100 includes a lower housing portion 200 and an upper housing portion 300. The upper housing portion 300 is rotatably coupled to the lower housing portion 200 at a hinge portion not illustrated within a predetermined angle.

The lower housing portion 200 is provided with a print head holding portion that detachably holds a print head 6. Further, a guide roller, which is a first guide unit for guiding the printer body 100 to move linearly in a printing direction that is a first direction, is rotatably fixed to the lower housing portion 200. The lower housing portion 200 holds a tracking sensor that detects a moving amount of the printer body 100 in a case of moving on a printing surface of the print medium P. The upper housing portion 300 holds a control board for controlling printing of the printer body 100, electrical components such as batteries, and buttons electrically connected to the control board. Therefore, the printer body 100 can perform printing in the printing direction. Thus, a small and lightweight handheld printer can be provided for users who do not need line break accuracy.

On the other hand, the printer body 100 does not have a line break mechanism. Therefore, in a case where it is desired to perform printing for a plurality of lines, in order to print the next line after printing one line, the operator needs to lift the printer body 100 once and move the printer body to the position of the next line before printing. Therefore, since the accuracy of line break may change according to the manual operation of the operator, it is difficult to perform line break with high accuracy. In the present embodiment, the printer body 100 can be equipped with a housing provided with the line break device 101 separately from the printer body 100. Therefore, in a case of printing that requires line break accuracy, the printer apparatus 102 equipped with the line break device 101 can be used.

In FIG. 18B, the line break device 101 has a structure different from that of the printer body 100, has the line break mechanism described in the above embodiments inside, and is configured to be detachable from the printer body 100. Further, a line break lever 4 is also provided in the line break device 101.

In a case where the printer body 100 wishes to print a plurality of lines that require line break accuracy, the line break device 101 is attached to and integrated with the printer body 100, and functions as a printer apparatus 102 capable of performing a line break operation.

The line break device 101 may include only the line break mechanism described in any of the first to fourth embodiments. However, in that case, the lower surface of the line break device 101 needs to be separated from the print medium P in a case of being mounted on the printer body 100 so as not to interfere with the operation of the guide roller of the printer body 100 during a printing scan. In this case, stability may not be maintained. Therefore, the line break device 101 may be provided with a guide roller having a roller portion that protrudes slightly downward compared with the roller portion of the guide roller included in the printer body 100, for example. In a case where the line break device 101 is attached to the printer body 100, stable operability can be provided by guiding the line break device 101 in the printing direction with the guide roller on the line break device 101 side.

In a printer other than the third embodiment, a description has been given of an example where the contact portion of the guide plate or the line break guide comes into contact with the print medium P by moving the guide plate or the line break guide. Here, the line break device 101 may be provided with a holding member that movably holds the guide roller, such as the guide plate of the third embodiment. The holding member may be retracted during a line break operation so that the contact portion of the guide plate or the line break guide comes into contact with the print medium P.

As has been described above, in the present embodiment, the line break device 101 is provided separately from the printer body 100, and the line break device 101 is attached to the printer body 100 for printing that requires line break accuracy. Thus, accurate line break operation can be performed as needed.

Sixth Embodiment

In the first to fifth embodiments, the line break mechanism has been mainly described. In the present embodiment, description will be given of an example where a line break mechanism is provided so as to realize a configuration that does not interfere with an effective printing area in a case of using the line break mechanism described in the first to fifth embodiments.

The effective printing area will be described. As described in the above embodiments, in the handheld printer, various inks are ejected from the print head by arranging the printer on the print medium and manually scanning the printer by the operator. Here, the effective printing area is restricted by the arrangement positions of the guide rollers 7L and 7R, which are the first guide unit that operate during manual scanning. For ease of understanding, it is assumed that the print medium is a thick paper such as a notebook. In a case of performing manual scanning, the roller portions 7*a* of the guide rollers 7L and 7R need to come into contact with the print medium. Therefore, in a case of performing printing at the top (previous line direction) of the notebook, for example, printing cannot be performed in an area between a discharge port on the previous line side of the print head and the roller portion 7*a* located on the previous line side. Likewise, there are areas where printing cannot be performed at the left and right edges and the bottom of the notebook. These areas where printing cannot be performed are called margin areas. That is, the effective printing area is an area excluding the margin areas on the print medium.

Here, the line break mechanism described in the first to fifth embodiments is provided with the contact portion, and this contact portion also comes into contact with the print medium during a line break operation. Therefore, the contact portion of the line break mechanism also affects the effective printing area. In the present embodiment, an arrangement configuration will be described that does not interfere with the effective printing area (that is, does not increase the margin area) even in a case of using the line break mechanism.

In the present embodiment, the printer 1 described in the first embodiment will be described as an example, but the same can be applied to the printer apparatuses described in the second to fifth embodiments.

Figure 19:
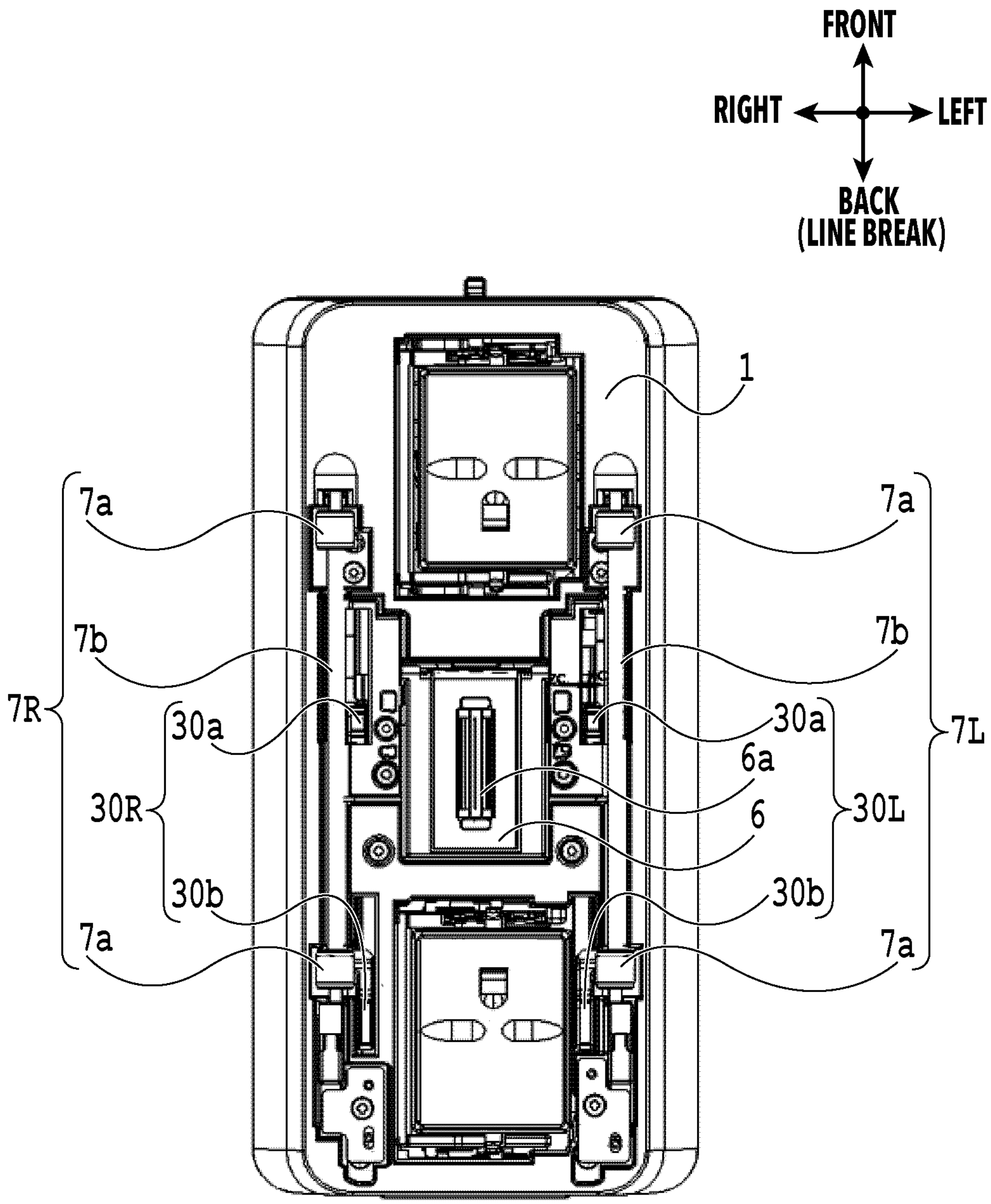
FIG. 19 is a bottom view of the printer, according to one more embodiment of the subject innovation.
Figure 20A:
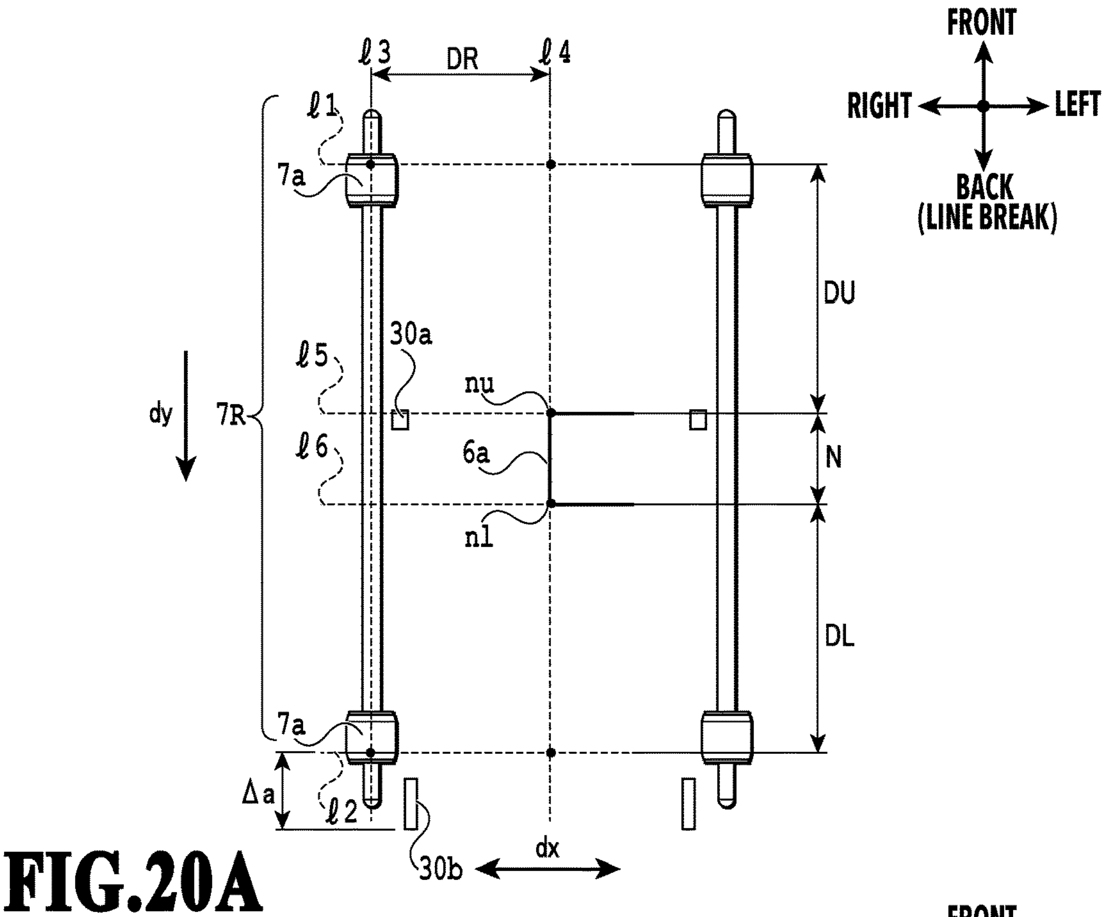
FIGS. 20A and 20B are schematic views illustrating a relationship between margin areas, according to one more embodiment of the subject innovation.
Figure 20B:
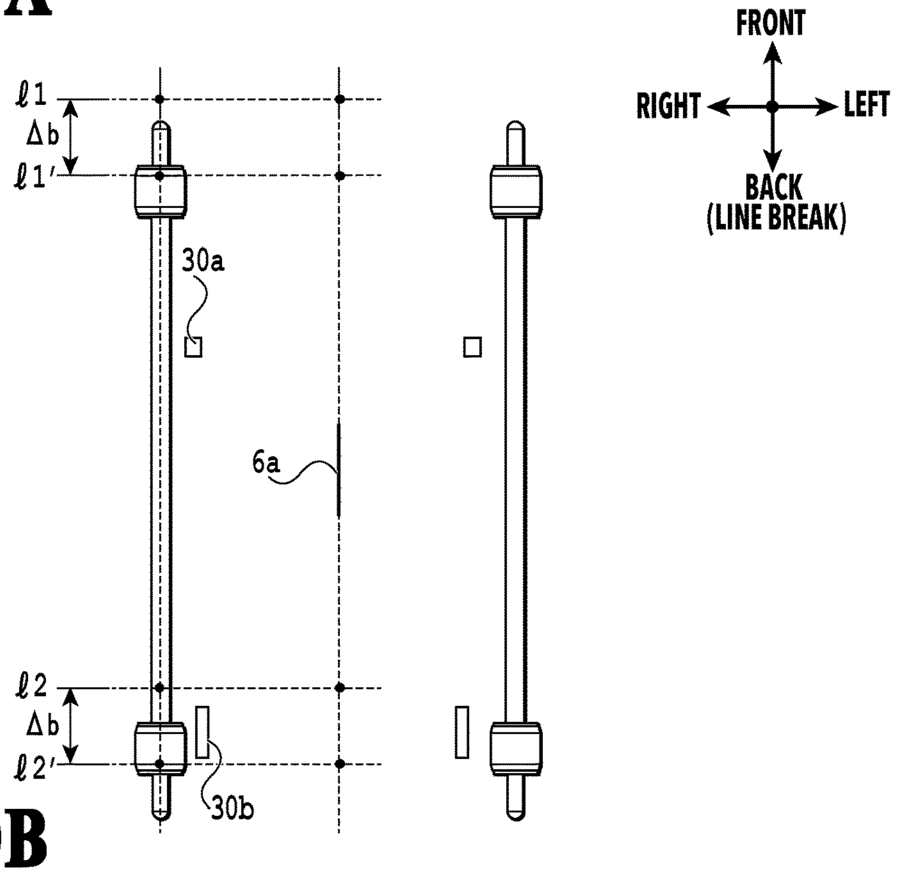

FIG. 19 is a bottom view of the printer 1. FIGS. 20A and 20B are schematic views illustrating a relationship between the print head 6, the first guide unit, and the second guide unit of the printer 1 and the margin area.

As illustrated in FIG. 19, the contact positions between the print medium P and the first and second contact portions 30*a* and 30*b* of the guide plates 30L and 30R as the second guide unit are set to be inside the guide rollers 7L and 7R in the left-right direction (printing scan direction). That is, the first and second contact portions 30*a* and 30*b* of the guide plate 30L are arranged at positions closer to the print head 6 in the printing scan direction than the roller portion 7*a* of the guide roller 7L. Likewise, the first and second contact portions 30*a* and 30*b* of the guide plate 30R are arranged at positions closer to the print head 6 in the printing scan direction than the roller portion 7*a* of the guide roller 7R. In the printing scan direction, the contact positions of the first and second contact portions 30*a* and 30*b* and the print medium P are arranged closer to the print head 6 than the contact position of the roller portion 7*a* and the print medium P. Therefore, the margin areas need not be increased in the left-right direction during a line break operation. Thus, the plurality of contact portions of the present embodiment are all provided so as to come into contact with the positions closer to the printing unit than the printing guide portion that is the roller portion 7*a* in the printing scan direction.

Next, the arrangement relationship in the line break direction will be described. As illustrated in FIG. 19, the first contact portion 30*a* is a contact portion on the upstream side (previous line side) in the line break direction (front-back direction). The second contact portion 30*b* is a contact portion on the downstream side (line break side) in the line break direction. The first contact portion 30*a* is arranged closer to the print head 6 than both of the roller portions 7*a* in the line break direction (front-back direction) of the guide rollers 7L and 7R in the line break direction. On the other hand, the second contact portion 30*b* is arranged on the downstream side of the roller portion 7*a* on the downstream side (line break side) of the guide rollers 7L and 7R in the line break direction. As illustrated in FIG. 20A, the distance between the second contact portion 30*b* and the roller portion 7*a* on the downstream side is assumed to be Δa. As illustrated in FIG. 20B, the distance that the roller portion 7*a* moves in the line break direction during a line break operation is assumed to be Δb. In the present embodiment, the second contact portion 30*b* is arranged so as to satisfy the relationship of Δb>Δa, which will be described below with reference to FIGS. 20A and 20B.

The above-mentioned arrangement relationship will be described again with reference to FIG. 20A. In the present embodiment, the guide rollers 7L and 7R as the first guide unit and the guide plates 30L and 30R as the second guide unit are arranged in line symmetry with respect to the nozzle surface 6*a* of the print head 6. In FIGS. 20A and 20B, the nozzle surface 6*a* is illustrated as a straight line for simplification. FIG. 20A illustrates a positional relationship before a line break operation, and FIG. 20B illustrates a positional relationship in a state where the line break operation is started and the roller portion 7*a* comes into contact with the print medium P again.

In FIG. 20A, DR represents a margin area on the right side. The right margin is determined by the distance between the contact position of the roller portion 7*a* of the guide roller 7R and the nozzle surface 6*a* in the printing scan direction (dx). The contact position of the guide roller 7R is located on the extension of a line 13 in FIG. 20A. The nozzle surface 6*a* is on the extension of a line 14. Therefore, the right margin DR is determined by the distance between the lines 13 and 14. The left margin can be obtained in the same way. In the present embodiment, the contact positions of the guide plates 30L and 30R as the second guide unit in the printing scan direction of the first and second contact portions 30*a* and 30*b* are configured to come into contact between the left and right margins. That is, the contact positions of the guide plates 30L and 30R as the second guide unit in the printing scan direction of the first and second contact portions 30*a* and 30*b* are configured to come into contact between the print head 6 and the guide rollers 7L and 7R, respectively. Therefore, the configuration that affects the left and right margins is the guide rollers 7L and 7R. In other words, the first and second contact portions 30*a* and 30*b* of the guide plates 30L and 30R do not affect the margin areas in the printing scan direction.

In FIG. 20A, DU represents a top margin in the line break direction. The upper margin is determined by the distance in the line break direction between the contact position of the roller portion 7*a* on the upstream side in the line break direction and a most upstream nozzle nu on the nozzle surface 6*a*. As illustrated in FIG. 20A, the locus in which the position where the roller portion 7*a* on the upstream side comes into contact with the print medium P on the most upstream side moves in the printing scan direction is a line 11. The locus of the most upstream nozzle nu moving in the printing scan direction is a line 15. The top margin DU is determined by the distance between the lines 11 and 15. In the present embodiment, a part of the first contact portion 30*a* is arranged to come into contact within the top margin DU in the line break direction. That is, the component that defines the top margin is not the first contact portion 30*a* but the roller portion 7*a* on the upstream side. Therefore, the first contact portion 30*a* does not affected the top margin DU.

In FIG. 20A, N represents the length of the nozzle surface 6*a*. The length N corresponds to the length of the printing area in the line break direction in the printing scan. The locus in which the most upstream nozzle nu moves in the printing scan direction is the line 15. The locus of a most downstream nozzle n1 moving in the printing scan direction is a line 16. An area (area N) between the lines 15 and 16 is a printing area, and printing is executed during a printing scan. Thus, the top and bottom margins are not defined. In the present embodiment, a part of the first contact portion 30*a* is arranged to come into contact with the range of the area N. Therefore, the first contact portion 30*a* does not affect the top margin DU.

In the present embodiment, a description has been given taking the positional relationship in which the first contact portion 30*a* comes into contact with a position straddling the top margin DU and the area N as an example. However, the positional relation may be such that a component does not define the top margin DU. For example, the first contact portion 30*a* may be arranged so as to come into contact with the range of a bottom margin DL to be described later, or the first contact portion 30*a* may be arranged so as to come into contact only within the area N. The first contact portion 30*a* may be arranged so as to come into contact only within the top margin DU.

In FIG. 20A, DL represents a bottom margin in the line break direction. The bottom margin is determined by the distance between the contact position of the roller portion 7*a* on the downstream side of the guide rollers 7L and R with the print medium P and the line break direction (dy) with the most downstream nozzle n1 of the nozzle surface 6*a*. The locus in which the position where the roller portion 7*a* on the downstream side comes into contact with the print medium P on the most downstream side moves in the printing scan direction is the line 12. The locus of the most downstream nozzle n1 moving in the printing scan direction is the line 16. On the downstream side, the position where the second contact portion 30*b* comes into contact with the print medium P is located downstream of the position where the roller portion 7*a* on the downstream side comes into contact with the print medium P by Δa in the line break direction. However, in the present embodiment, the component that defines the bottom margin is not the second contact portion 30*b* of the guide plates 30L and R, but the roller portion 7*a* on the downstream side. In other words, the bottom margin is determined by the distance between the lines 12 and 16. The reason for this will be described below.

In FIG. 20B, Δb represents a moving amount per line break during a line break operation. That is, the moving amount of the roller portion 7*a* in the line break direction is Δb. As illustrated in FIGS. 20A and 20B, the locus in which the position where the roller portion 7*a* comes into contact with the print medium P on the most downstream side moves in the printing scan direction is the line 12. On the other hand, as illustrated in FIG. 20B, the locus in which the position where the roller portion 7*a* comes into contact with the print medium P on the most downstream side after the line break moves in the printing scan direction is a line 12'. That is, if the contact position of the second contact portion 30*b* is provided on the upstream side (previous line side) of the line 12', the second contact portion 30*b* of the guide plates 30L and R is not a component that defines the bottom margin DL. In other words, in a case where the contact position of the second contact portion 30*b* of the guide plates 30L and R is located on the downstream side (line break side) of the line 12', the second contact portion b becomes a component that defines the bottom margin DL. That is, the effective printing area is reduced by the contact amount of the second contact portion 30*b*.

In the present embodiment, the second contact portion 30*b* is arranged to come into contact on the upstream side of the line 12' that determines the bottom margin after the line break. That is, as described above, the second contact portion 30*b* is configured to satisfy Δb>Δa. Therefore, the second contact portion 30*b* does not affect the bottom margin DL.

As has been described above, in the present embodiment, the contact positions of the first and second contact portions 30*a* and 30*b* of the guide plates 30L and 30R as the second guide unit with the print medium P are arranged at appropriate positions. Therefore, the first and second contact portions 30*a* and 30*b* are suppressed from affecting the top, bottom, left, and right margin areas. Thus, even if the line break mechanism is provided, it is possible to maximize the effective printing area of the print medium without affecting the effective printing area.

Other Embodiments

The configuration of the line break mechanism has been mainly described. As another embodiment, an example of a control unit that performs various kinds of control will be specifically described.

Figure 21:
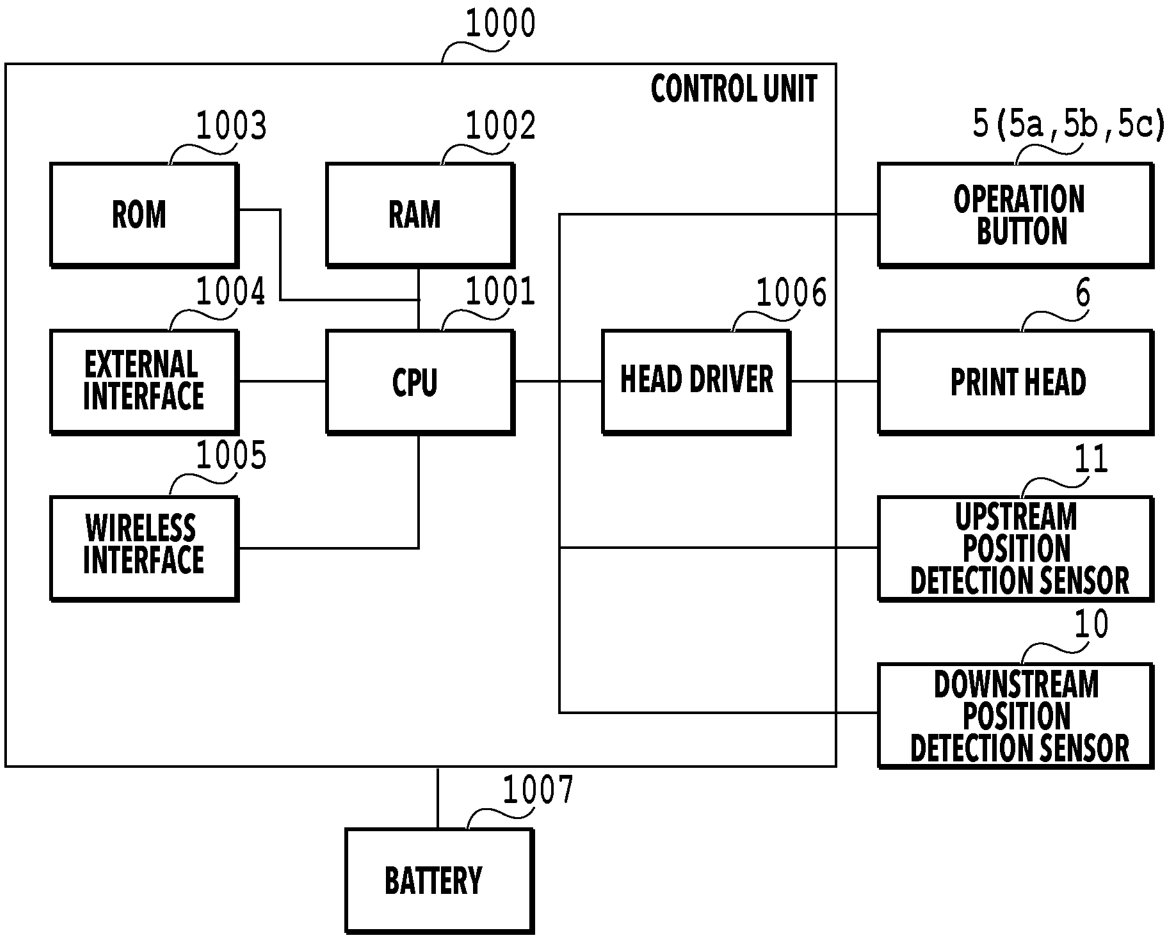
FIG. 21 is a block diagram including a control unit upon driving a print head, according to one more embodiment of the subject innovation.

FIG. 21 is a block diagram including a control unit associated with driving of the print head 6. Hereinafter, description will be given based on the configuration of the first embodiment. The printer 1 includes a control unit 1000, a battery 1007, operation buttons 5, a print head 6, a downstream position detection sensor 10, and an upstream position detection sensor 11. The control unit 1000 includes a CPU 1001, a RAM 1002, a ROM 1003, an external interface 1004, a wireless interface 1005, and a head driver 1006.

The CPU 1001 performs data processing, obtaining sensor information, and controlling the driving of the print head. The RAM 1002 is used for temporarily storing programs and image data to be printed and the like. The ROM 1003 stores programs and various setting values. The head driver 1006 performs control for ejecting the ink from the nozzles in the print head 6. The operation buttons 5 include input buttons such as a power button 5*a*, a wireless connection button 5*b*, and a printing start button 5*c*. In addition, an operation panel may be provided, including various switches, a display unit such as an LED display, a buzzer, and the like. The external interface 1004 is responsible for data exchange with an external control apparatus and the like. The wireless interface 1005 wirelessly controls the printer 1 in place of the external interface 1004. The battery 1007 is used to drive the printer 1 in a cordless manner.

In the second embodiment or the like, a description has been given of an example where the guide plates 30L and 30R as the second guide unit are driven by an actuator such as a motor or a solenoid connected to the drive train. In this case, as the line break button not illustrated is pressed in FIG. 21, the control unit 1000 drives the actuator to drive the drive train.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-125312, filed Jul. 30, 2021, which is hereby incorporated by reference wherein in its entirety.

What is claimed is:

1. A printing apparatus comprising:

an apparatus body held by a user and provided with a printing unit configured to perform printing in a case of being moved in a first direction;

a first guide unit configured to guide the movement in the first direction;

a second guide unit rotatably held with respect to a structure fixed to the apparatus body and configured to guide movement in a second direction intersecting with the first direction; and a drive unit configured to be connected with the second guide unit and to rotate the second guide unit so that the structure moves to the second direction relative to the second guide unit by driving of the drive unit.

2. The printing apparatus according to claim 1, further comprising:

an operation unit for driving the drive unit.

3. The printing apparatus according to claim 2, wherein the operation unit includes a lever connected to the drive unit, and the printing apparatus is moved in the second direction by an operator operating the operation unit.

4. The printing apparatus according to claim 2, further comprising:

an actuator connected to the drive unit; and a control unit configured to control an operation of the actuator, wherein the printing apparatus is moved in the second direction by the control unit driving the actuator as an operator operates the operation unit.

5. The printing apparatus according to claim 2, wherein a direction of an operation force in a case where the operator operates the operation unit is a direction that forms an acute angle with the second direction.

6. The printing apparatus according to claim 1, wherein the second guide unit is located at a first position that is a state where a printing operation for printing can be performed in a case of scanning in the first direction, is displaced by being driven by the drive unit, moves the printing apparatus in the second direction in the process of displacement, and returns to the first position at the end of driving by the drive unit.

7. The printing apparatus according to claim 6, further comprising:

a reset unit configured to return the second guide unit to the first position after the printing apparatus is moved in the second direction.

8. The printing apparatus according to claim 1, wherein the second guide unit has a contact portion that comes into contact with a printing surface of the print medium, and the contact portion is not displaced with respect to the printing surface of the print medium while the contact portion is in contact with the printing surface of the print medium.

9. The printing apparatus according to claim 8, wherein the first guide unit is separated from the printing surface as the contact portion of the second guide unit comes into contact with the printing surface of the print medium, the printing apparatus further comprising:

a brake unit configured to decelerate the driving of the second guide unit in a case where the first guide unit comes into contact with the printing surface again from the state of being separated from the printing surface.

10. The printing apparatus according to claim 1, wherein the second guide unit has a contact portion that comes into contact with a printing surface of the print medium, and a contact position of the contact portion changes in the second direction with respect to the print medium while the printing apparatus is moved in the second direction.

11. The printing apparatus according to claim 8, wherein the contact portion of the second guide unit is formed of at least one of a material and a shape high in frictional resistance to the printing surface of the print medium.

12. The printing apparatus according to claim 8, wherein the contact portion of the second guide unit is provided at a position that comes into contact with the print medium outside a printing range for the printing unit just before moving in the second direction.

13. The printing apparatus according to claim 1, wherein the second guide unit is driven by the drive unit so as to shift from a state of being separated from the printing surface of the print medium through a state of being at least partially in contact with the printing surface of the print medium to a state of being separated again, and the second guide unit moves the printing apparatus in the second direction while the second guide unit is driven by the drive unit in a state of being in contact with the printing surface of the print medium.

14. The printing apparatus according to claim 1, further comprising:

a position determination unit configured to determine a position of the second guide unit in the first direction; and a biasing unit configured to bias the second guide unit with respect to the position determination unit, wherein the biasing unit allows the second guide unit to come into contact with the position determination unit before the second guide unit comes into contact with the printing surface of the print medium in a case of moving the printing apparatus in the second direction.

15. The printing apparatus according to claim 1, wherein the first guide unit is held by the second guide unit, the structure has a contact portion that comes into contact with the printing surface of the print medium, and driving by the drive unit displaces the second guide unit with respect to the structure, the contact portion of the structure comes into contact with the printing surface of the print medium, and the first guide unit is moved in the second direction with respect to the apparatus body.

16. The printing apparatus according to claim 1, wherein the first guide unit is held by the second guide unit the second guide unit is driven by the drive unit such that the first guide unit is moved from a first position where the first guide unit is in contact with the printing surface of the print medium through a state of being separated from the printing surface of the print medium to the first position again, and the printing apparatus is moved in the second direction in a state where the second guide unit is driven by the drive unit and while the first guide unit is in contact with the printing surface of the print medium.

17. The printing apparatus according to claim 1, further comprising:

a reverse drive restricting unit in at least one of the second guide unit and the drive unit, the reverse drive restricting unit being configured to restrict reverse drive of the movement in the second direction.

18. The printing apparatus according to claim 1, wherein the structure is integrally fixed to the apparatus body of the printing apparatus.

19. The printing apparatus according to claim 1, wherein the structure is detachably configured in the apparatus body of the printing apparatus.

20. The printing apparatus according to claim 1, wherein a printing guide portion in which the first guide unit comes into contact with the printing surface of the print medium is formed of at least one of a material and a shape high in frictional resistance to the printing surface of the print medium.

21. The printing apparatus according to claim 20, wherein the printing guide portion is provided at least in a position not in contact with a printing area where printing is performed by the printing unit.

22. The printing apparatus according to claim 1, wherein the first guide unit includes a roller portion held by the structure, and the printing apparatus is moved in the first direction by rotation of the roller portion in the first direction.

23. The printing apparatus according to claim 1, wherein a plurality of the first guide units are provided in the first direction across the printing unit, and each of the first guide units is provided with a plurality of printing guide portions that come into contact with the printing surface of the print medium, the second guide unit has a plurality of contact portions that come into contact with the printing surface of the print medium, and the plurality of contact portions are all provided so as to come into contact with a position closer to the printing unit side than the printing guide portion in the first direction.

24. The printing apparatus according to claim 23, wherein an upstream contact portion in the second direction among the plurality of contact portions is provided so as to come into contact with a position closer to the printing unit side in the second direction than an upstream printing guide portion in the second direction.

25. The printing apparatus according to claim 23, wherein a downstream contact portion in the second direction among the plurality of contact portions is provided so as to come into contact again with a position closer to the printing unit side than a position in contact with the printing surface after a downstream printing guide portion in the second direction among the first guide units is separated from the printing surface.

26. The printing apparatus according to claim 23, wherein a distance between a downstream contact portion in the second direction among the plurality of contact portions and a downstream printing guide portion in the second direction among the plurality of printing guide portions is shorter than a distance between a position before the downstream printing guide portion is separated from the printing surface and a position where the downstream printing guide portion comes into contact with the printing surface again after being separated from the printing surface.

* * * * *